(12) United States Patent
Heath et al.

(10) Patent No.: US 11,214,021 B2
(45) Date of Patent: Jan. 4, 2022

(54) METHOD AND SYSTEM FOR MANUFACTURING A CURED COMPOSITE STRUCTURE

(71) Applicant: The Boeing Company, Chicago, IL (US)

(72) Inventors: Richard E. Heath, Mount Pleasant, SC (US); Richard A. Prause, Charleston, SC (US); Andrew E. Modin, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/811,262

(22) Filed: Mar. 6, 2020

(65) Prior Publication Data

US 2021/0276285 A1 Sep. 9, 2021

(51) Int. Cl.
 *B29C 70/44* (2006.01)
 *B29L 31/30* (2006.01)
(52) U.S. Cl.
 CPC ..... *B29C 70/443* (2013.01); *B29L 2031/3076* (2013.01)
(58) Field of Classification Search
 None
 See application file for complete search history.

(56) References Cited

U.S. PATENT DOCUMENTS

| | | | | |
|---|---|---|---|---|
| 5,968,445 | A | * 10/1999 | McCarville | B29C 70/44 156/285 |
| 2008/0111024 | A1 | * 5/2008 | Lee | B64C 1/068 244/121 |
| 2010/0009124 | A1 | 1/2010 | Robins et al. | |
| 2013/0036922 | A1 | 2/2013 | Stewart et al. | |
| 2019/0381700 | A1 | 12/2019 | Peterson et al. | |

OTHER PUBLICATIONS

U.S. Appl. No. 16/010,905: "Method for Co-Curing Perpendicular Stiffeners".
U.S. Appl. No. 16/163,759: "Mandrel for Processing a Composite Part and Method for Fabricating a Composite Part".
(Continued)

*Primary Examiner* — Barbara J Musser
(74) *Attorney, Agent, or Firm* — Walters & Wasylyna LLC

(57) ABSTRACT

A method for manufacturing a cured composite structure from first stringers, second stringers and a panel comprising a first side and a second side, the method includes, for each first stringer, supporting the first stringer on the first side of the panel using a substantially rigid mandrel positioned within a first cavity defined between the first stringer and the first side of the panel, for each second stringer, supporting the second stringer on the second side of the panel using a flexible mandrel positioned within a second cavity defined between the second stringer and the second side of the panel, and co-curing the first stringers, the panel, and the second stringers while each of the one or more first stringers are supported by the respective substantially rigid mandrel and each of the one or more second stringers are supported by the respective flexible mandrel.

23 Claims, 24 Drawing Sheets

(56) References Cited

OTHER PUBLICATIONS

U.S. Appl. No. 16/163,763: "Multi-Component Mandrel for Processing a Composite Part and Method for Fabricating a Composite Part".

U.S. Appl. No. 16/163,770: "Multi-Segment Mandrel for Processing a Composite Part and Method for Fabricating a Composite Part".

Evonik, Rohacell®, "PMI Foam That Makes Lightweight Construction Easy," https://www.rohacell.com/product/rohacell/en/abaut (Jan. 2019).

European Patent Office, Extended European Search Report, App. No. 21159392.6 (dated Aug. 4, 2021).

\* cited by examiner

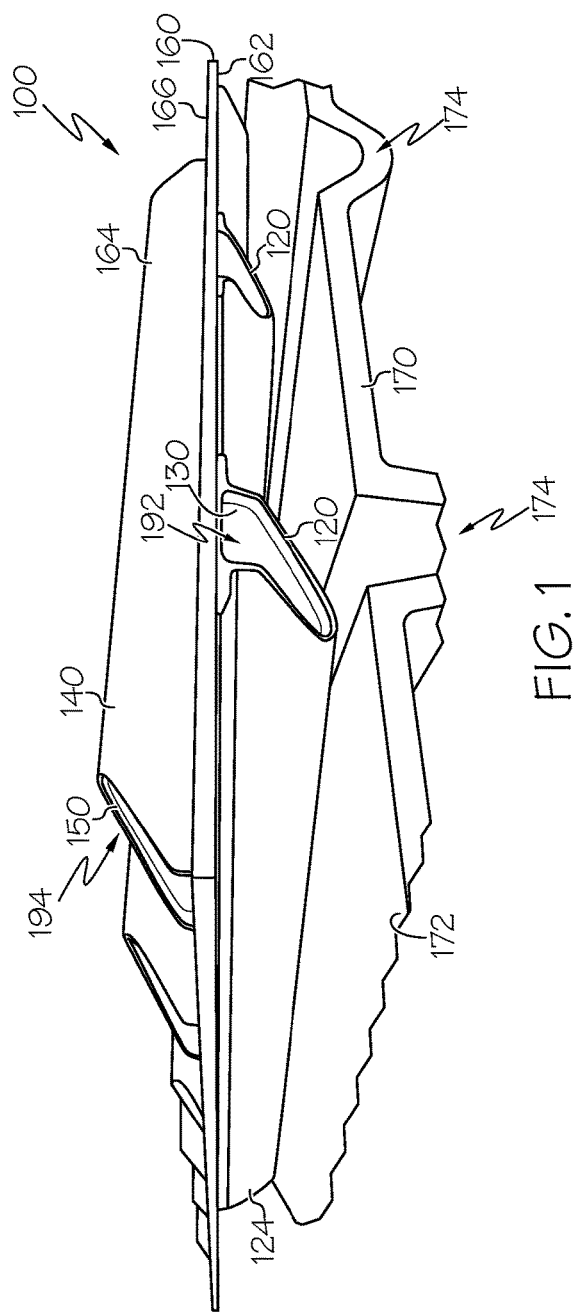
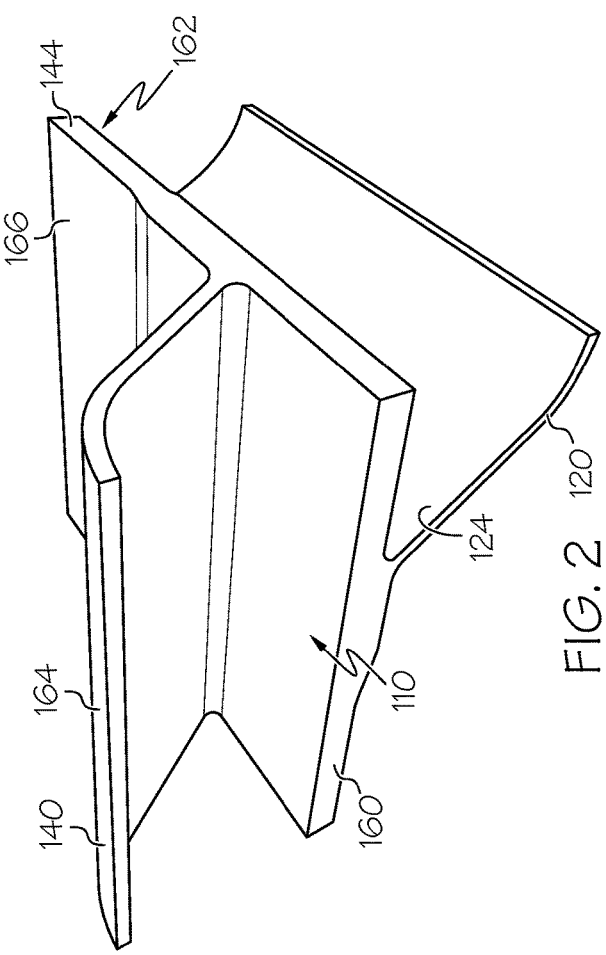

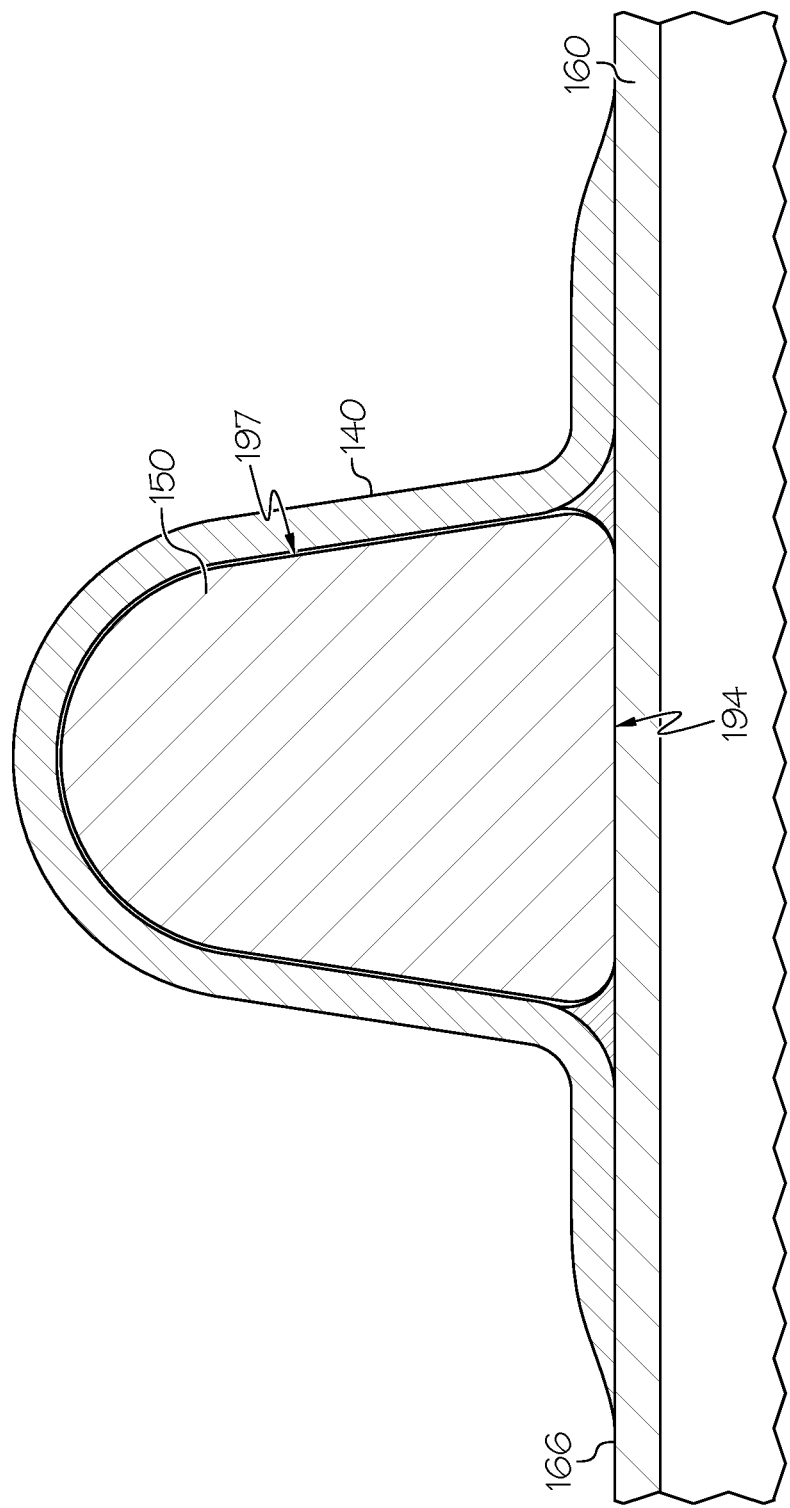

METHOD AND SYSTEM FOR MANUFACTURING A CURED COMPOSITE STRUCTURE

FIELD

The present disclosure is generally related to composite structures and, more particularly, to reinforcement structures comprising composite materials. Still more particularly, the present disclosure is related to systems and methods for manufacturing cured composite structures.

BACKGROUND

Composite materials may be used in the construction of composite structures of an aircraft and other vehicles and assemblies. Composite structures used in the construction of aircraft, or other vehicles, or other assemblies may include reinforced composite panels.

It is sometimes desirable to form composite structures having a plurality of sides, each side having one or more stringers or stiffeners thereon to reinforce the panel. In some manufacturing processes, composite structures are fabricated, cured, and otherwise processed as discrete parts that are subsequently fastened together. Some of these manufacturing processes include fastening stiffeners to the structure, which can increase cost and weight and thermoplastic welding which can be difficult at stiffener intersections and can increase cost. An alternative to each of these latter manufacturing processes is to co-cure structures. However, an example issue with prior efforts to co-cure structures with stiffeners on both sides of a structure is that the prior efforts have resulted in defects in the center structure. In some cases, these defects have been due to pressure imbalances at the stiffener intersections. These pressure imbalances have caused the laminate to distort or wrinkle.

It remains of interest to develop and improve upon cured composite structures and the methods for making such cured composite structures. There is a desire for methods and apparatuses that produce more even pressure at the stiffener intersections in order to reduce or eliminate distortion in the center structure.

SUMMARY

Disclosed are methods for manufacturing cured composite structures from one or more first stringers, one or more second stringers, and a panel, the panel comprising a first side and a second side opposed from the first side.

In one example, the disclosed method includes steps of: (1) for each first stringer of the one or more first stringers, supporting the first stringer on the first side of the panel using a substantially rigid mandrel such that the substantially rigid mandrel is positioned within a first cavity defined between the first stringer and the first side of the panel; (2) for each second stringer of the one or more second stringers, supporting the second stringer on the second side of the panel using a flexible mandrel such that the flexible mandrel is positioned within a second cavity defined between the second stringer and the second side of the panel; and (3) co-curing the one or more first stringers, the panel, and the one or more second stringers while each of the one or more first stringers are supported by the respective substantially rigid mandrel and each of the one or more second stringers are supported by the respective flexible mandrel.

In another example, the disclosed method employs a rigid tool that defines one or more troughs therein and includes steps of: (1) for each first stringer of the one or more first stringers, (i) positioning the first stringer on the rigid tool such that the first stringer is at least partially within a trough of the one or more troughs and (ii) positioning a substantially rigid mandrel on the first stringer such that the substantially rigid mandrel is at least partially within the trough; (2) positioning the panel over the one or more first stringers and over the substantially rigid mandrel such that the first side of the panel faces toward the one or more first stringers and toward the substantially rigid mandrel, and the second side of the panel faces away from the one or more first stringers and away from the substantially rigid mandrel; and (3) for each second stringer of the one or more second stringers, (i) positioning a flexible mandrel on the second side of the panel and (ii) positioning the second stringer over the flexible mandrel.

In yet another example, the disclosed method employs a rigid tool that defines one or more troughs therein and includes steps of: (1) for each first stringer of the one or more first stringers, (i) positioning the first stringer on the rigid tool such that the first stringer is at least partially within a trough of the one or more troughs and (ii) positioning a flexible mandrel on the first stringer such that the flexible mandrel is at least partially within the trough; (2) positioning the panel over the one or more first stringers and over the flexible mandrel such that the first side of the panel faces toward the one or more first stringers and toward the flexible mandrel, and the second side of the panel faces away from the one or more first stringers and away from the flexible mandrel; and (3) for each second stringer of the one or more second stringers, (i) positioning a substantially rigid mandrel on the second side of the panel and (ii) positioning the second stringer over the substantially rigid mandrel.

Also disclosed are systems for manufacturing cured composite structures from one or more first stringers, one or more second stringers, and a panel, the panel comprising a first side and a second side opposed from the first side.

In one example, the disclosed system includes one or more substantially rigid mandrels, each substantially rigid mandrel positioned within a first cavity defined between a first stringer of the one or more first stringers and the first side of the panel; one or more flexible mandrels, each flexible mandrel positioned within a second cavity defined between a second stringer of the one or more second stringers and the second side of the panel; and a curing oven configured to receive therein the panel, the one or more first stringers, the one or more second stringers, the one or more substantially rigid mandrels, and the one or more flexible mandrels.

Also disclosed are cured composite structures manufactured using the disclosed systems and methods.

Other examples of the disclosed methods and systems for manufacturing cured composite structures, as well as the cured composite structures manufactured using the disclosed systems and methods, will become apparent from the following detailed description, the accompanying drawings and the appended claims.

BRIEF DESCRIPTION OF THE DRAWINGS

FIG. 1 is a perspective view of an example of a composite structure.

FIG. 2 is a perspective view of a close-up section of a composite structure.

FIG. 13 is a section view of an example of a mandrel in a cavity defined between a stringer and a panel.

DETAILED DESCRIPTION

Figure 3:
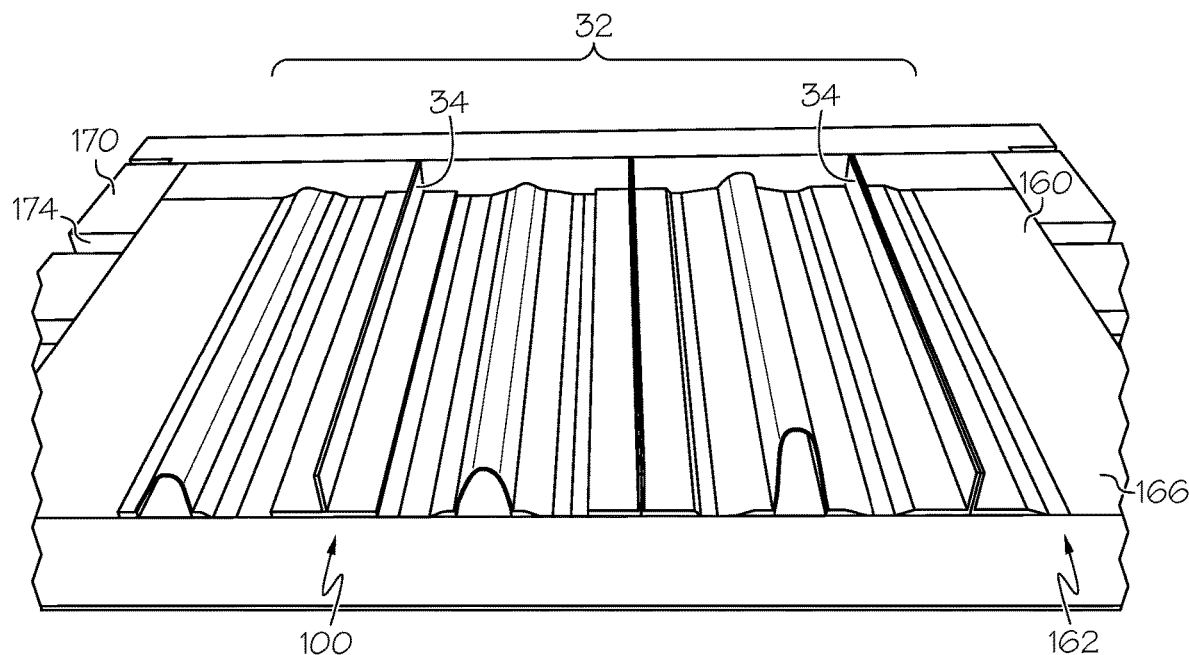
FIG. 3 is a perspective view of an example of a partially assembled composite structure.

The following detailed description refers to the accompanying drawings, which illustrate specific non-limiting examples of the disclosure. Other examples having different structures and operations do not depart from the scope of the present disclosure. Like reference numerals may refer to the same element or component in the different drawings.

Disclosed are non-limiting examples of methods and systems for manufacturing a cured composite structure. As shown in FIG. 1, a non-limiting aspect of a first example of a cured composite structure 100 includes one or more first stringers 120, one or more second stringers 140, and a panel 160. In this first example, the panel 160 includes a first side 162 and a second side 166 opposed from the first side 162.

Figure 4:
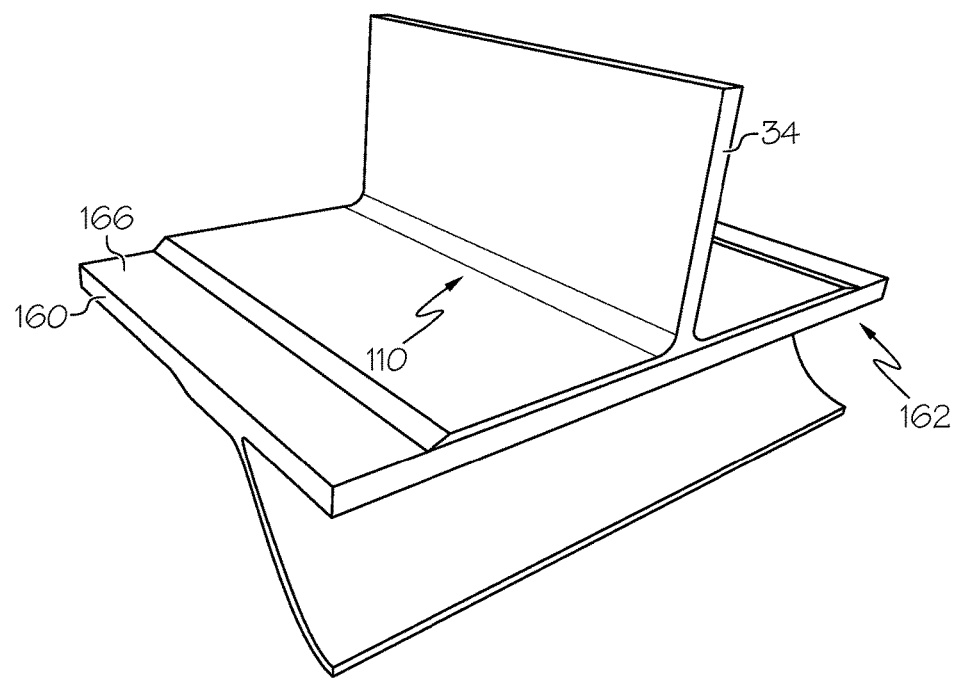
FIG. 4 is a perspective view of a close-up section a composite structure.

By way of introduction, FIGS. 1-4 show details of certain aspects of cured composite structures 100. FIG. 1 shows a cured composite structure 100 where a panel 160 includes a set of first stringers 120 on a first side 162 (e.g., hat stringers) and a set of second stringers 140 on a second side 166 (e.g., hat stringers). FIG. 2 shows a close-up section of FIG. 1 showing how the stringers 120, 140 are arranged and a stiffener intersection 110. FIG. 3 shows a finished cured composite structure 100 where a panel 160 includes a set of first stringers (not shown in this view) on a first side 162, which includes hat stringers, and a set of second stringers 140 on a second side 166, which includes hat stringers and blade stringers 34. FIG. 4 shows a close-up section of FIG. 2 showing how the stringers 120, 140 are arranged and a stiffener intersection 110. Some of the methods by which these aspects of cured composite structures 100 are produced are set forth in detail below.

Figure 5A:
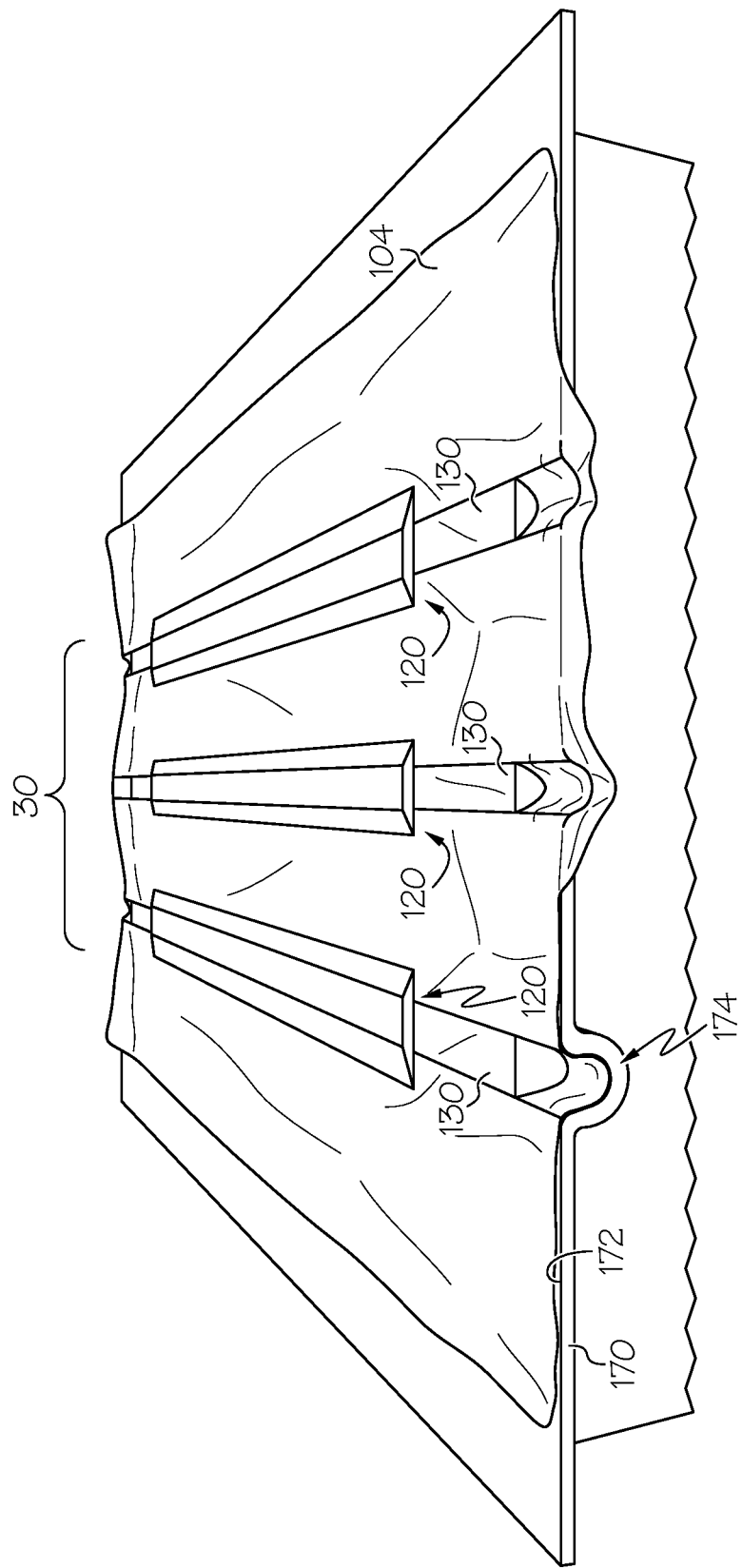
FIG. 5A is a perspective view of an example of a partially assembled composite structure.
Figure 5B:
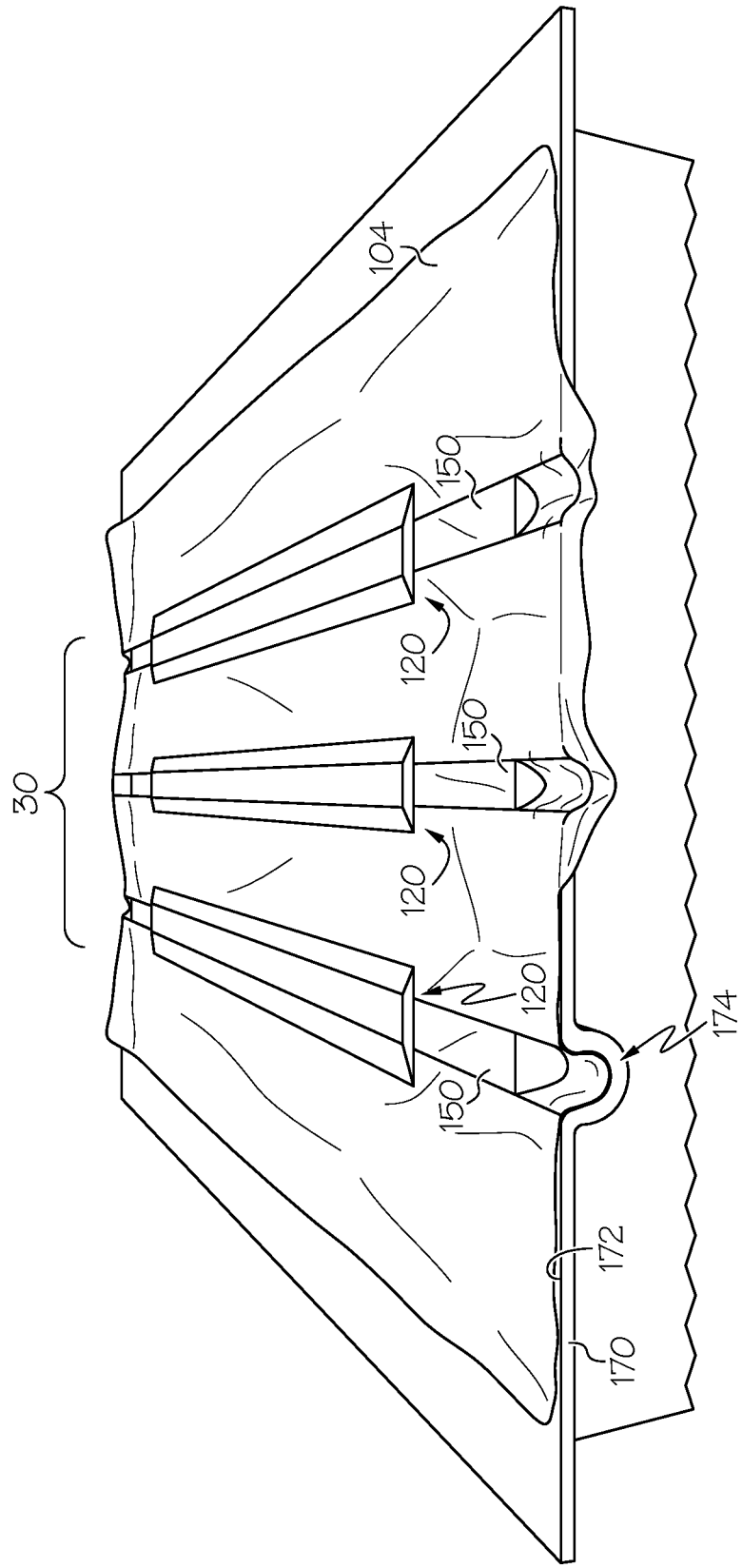
FIG. 5B is a perspective view of an example of a partially assembled composite structure.
Figure 6A:
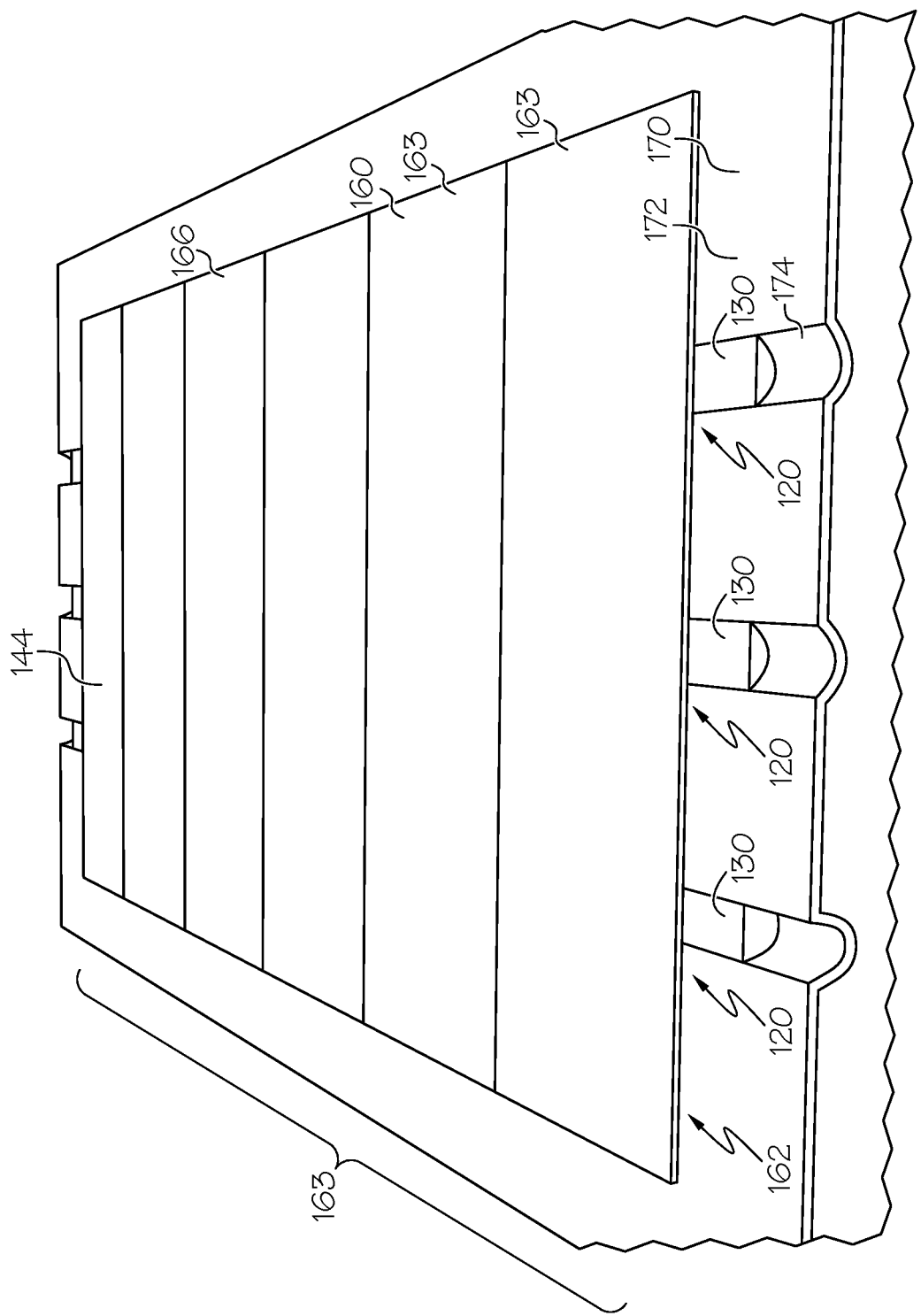
FIG. 6A is a perspective view of an example of a partially assembled composite structure.
Figure 6B:
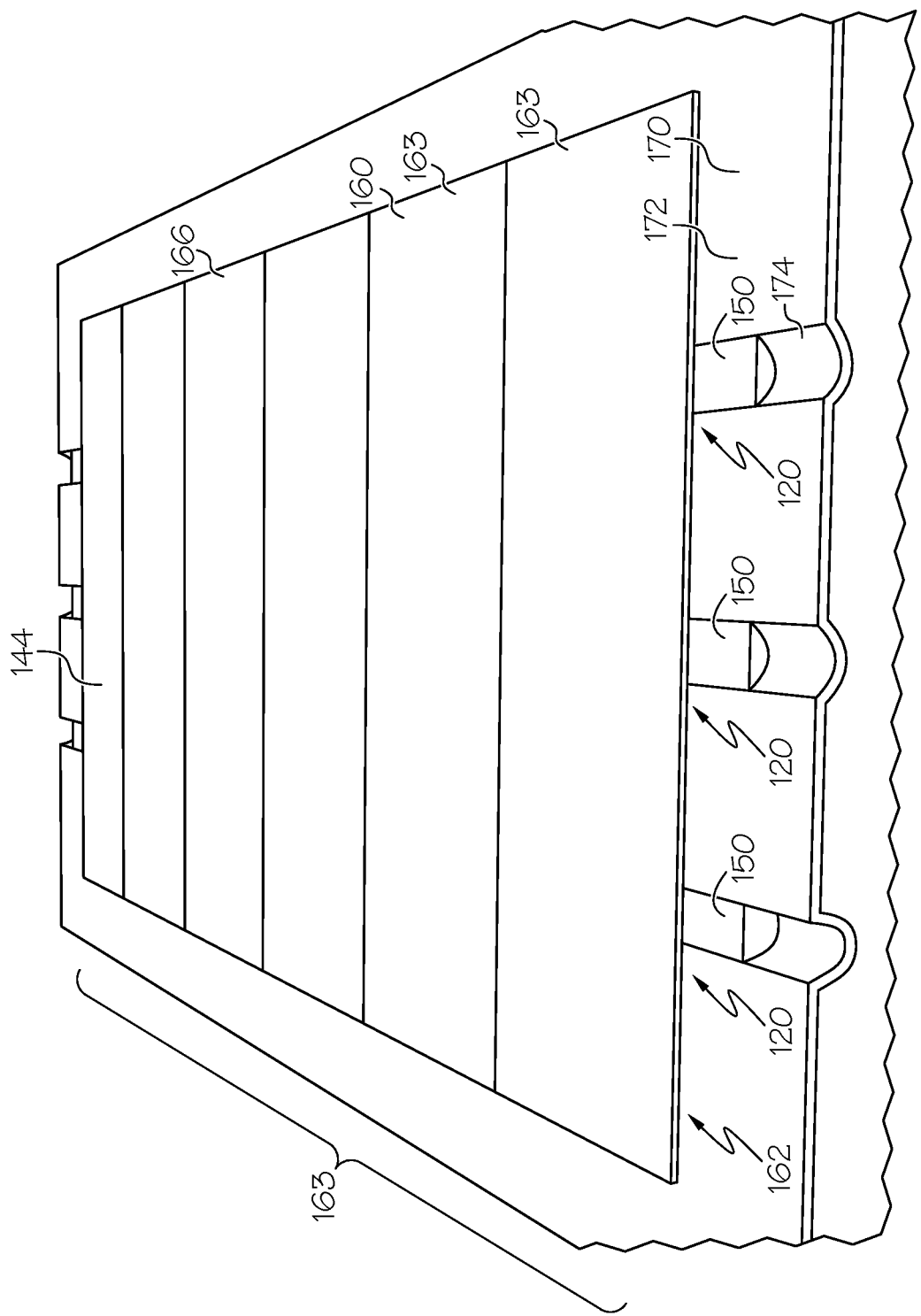
FIG. 6B is a perspective view of an example of a partially assembled composite structure.
Figure 7A:
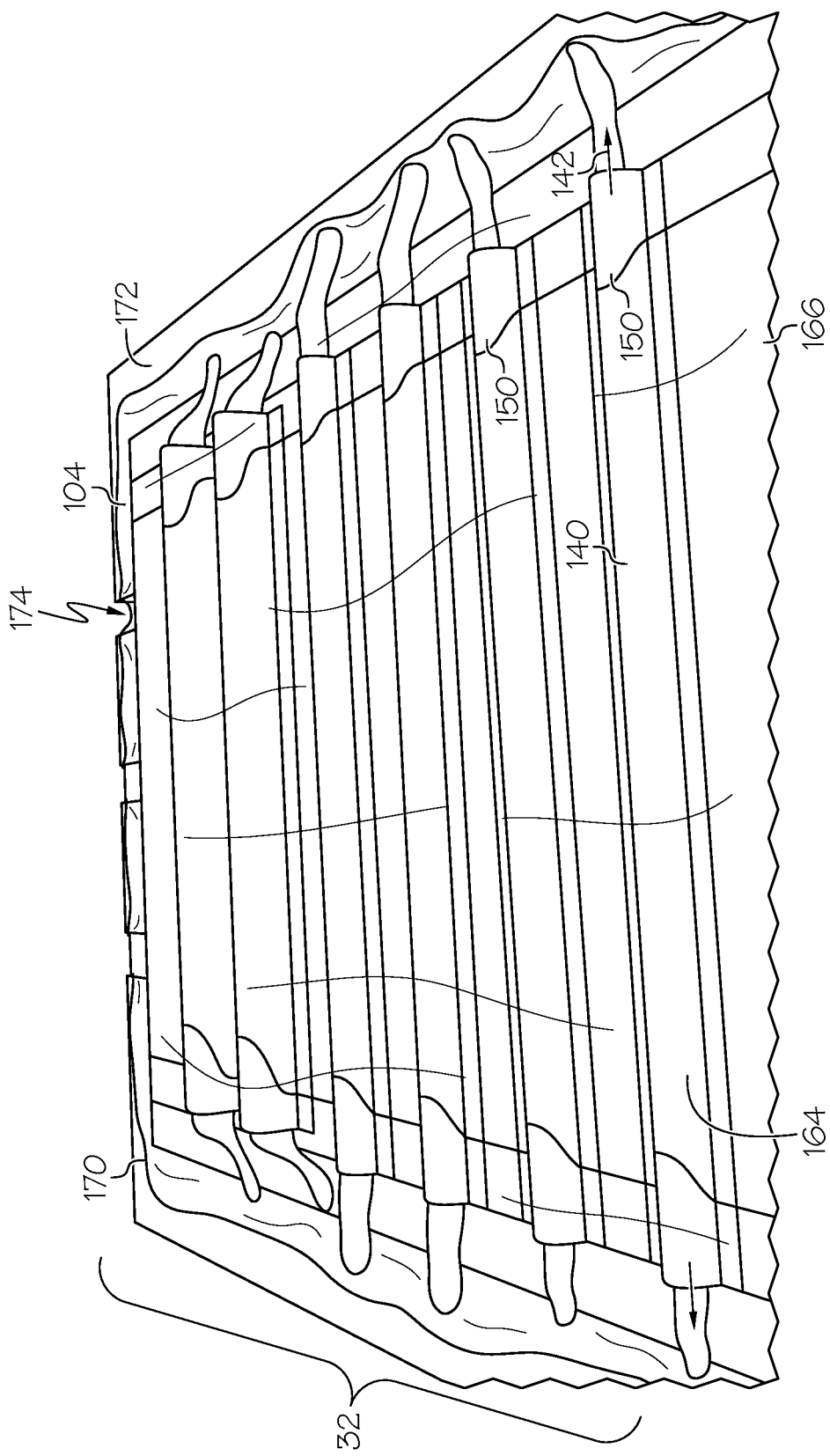
FIG. 7A is a perspective view of an example of a partially assembled composite structure.
Figure 7B:
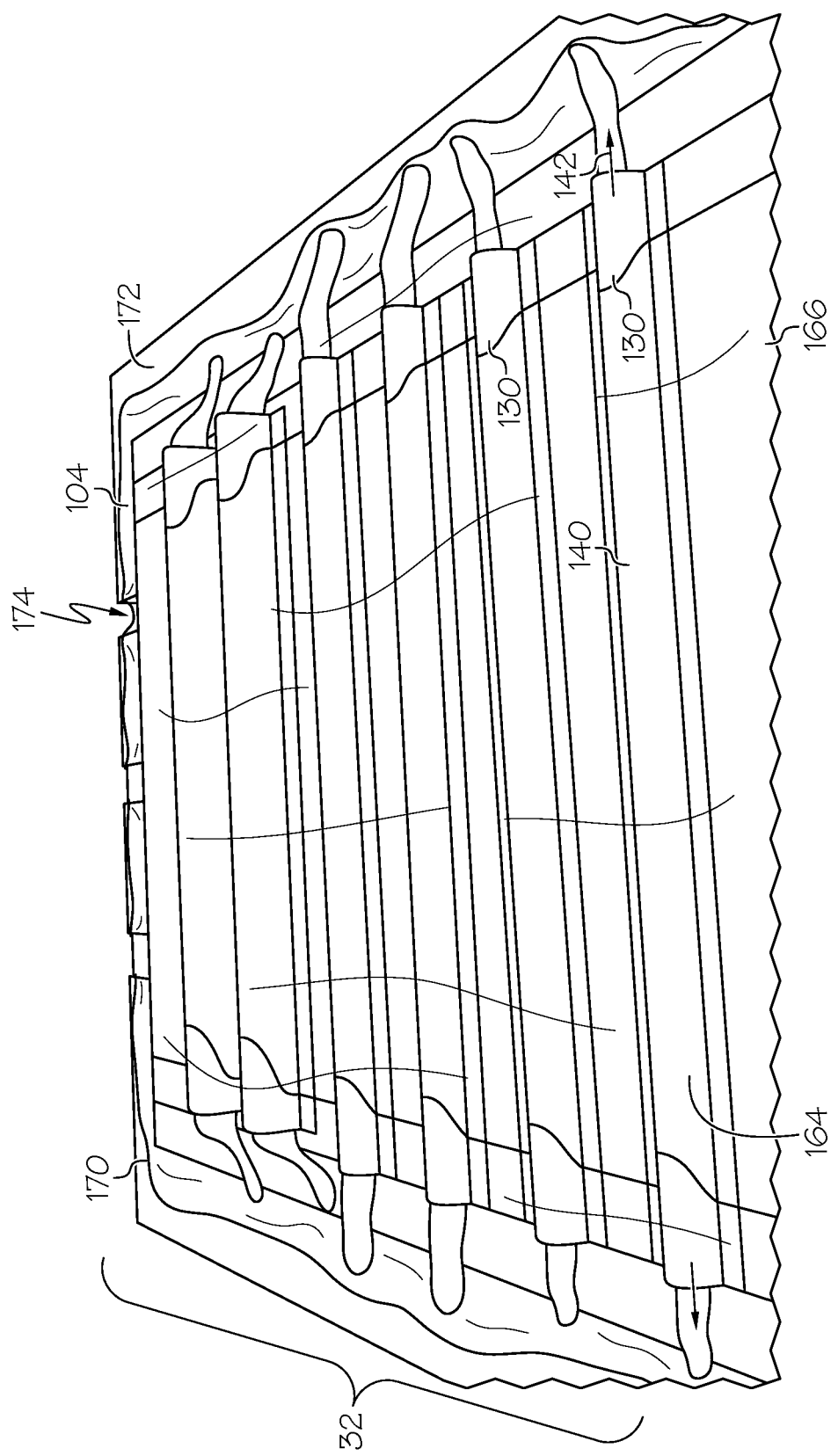
FIG. 7B is a perspective view of an example of a partially assembled composite structure.
Figures 8, 9:
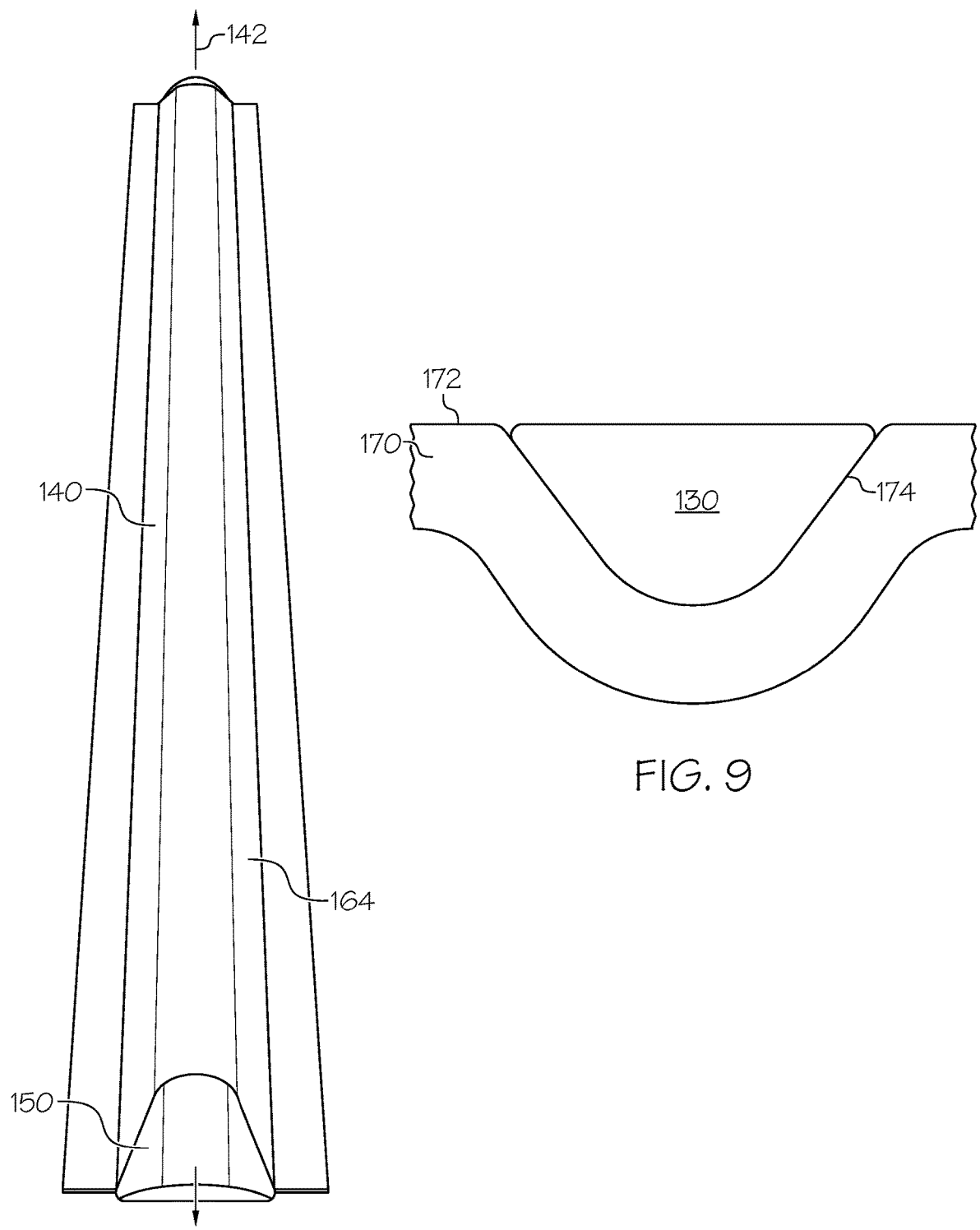
FIG. 8 is a perspective view of an example of a composite hat stringer and a mandrel subassembly.
FIG. 9 is a close-up sectional view of an example of a tooling trough and a mandrel subassembly.
Figure 10:
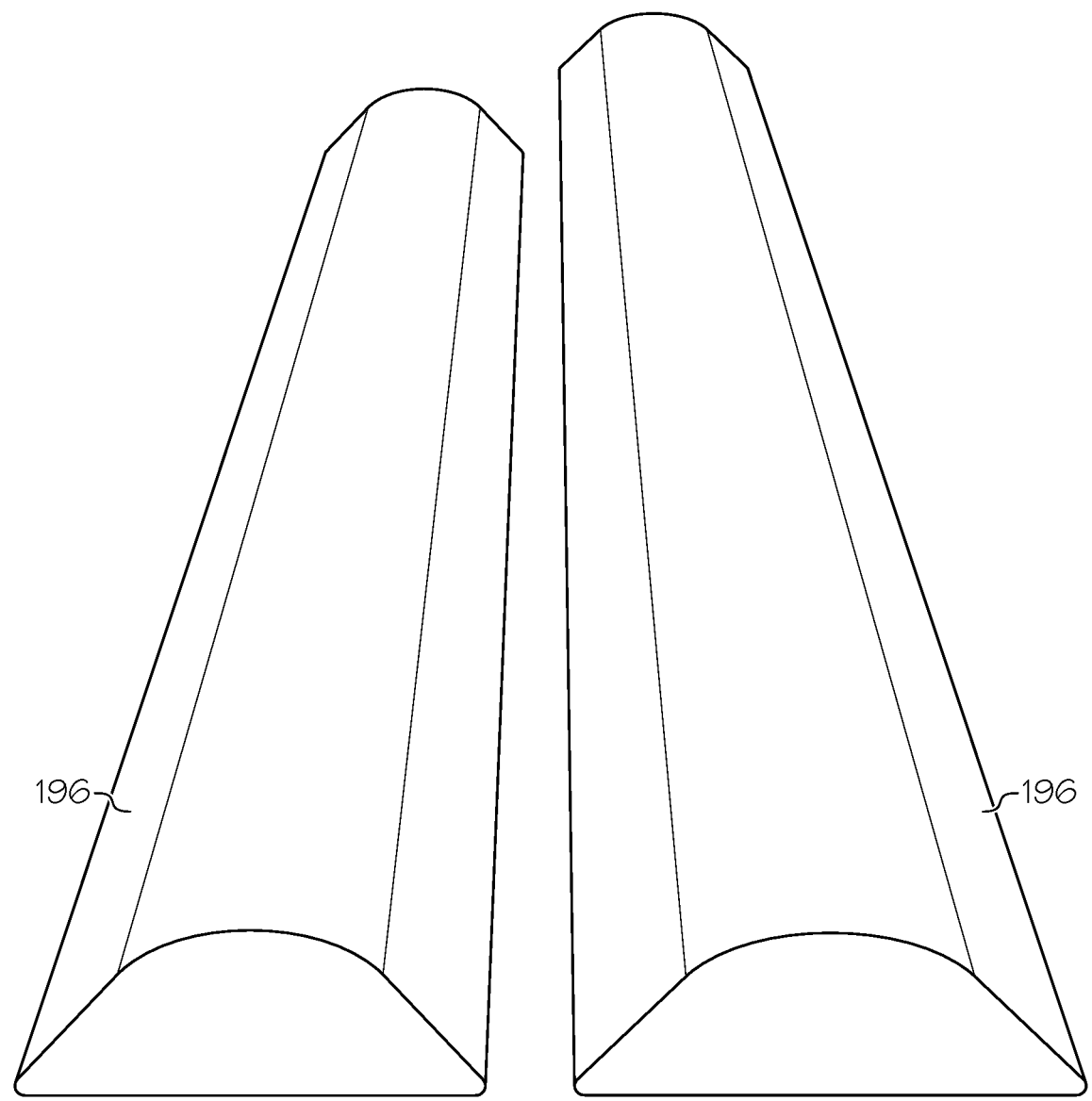
FIG. 10 is a perspective view of an example of a mandrel comprising an elastomeric material.
Figure 11:
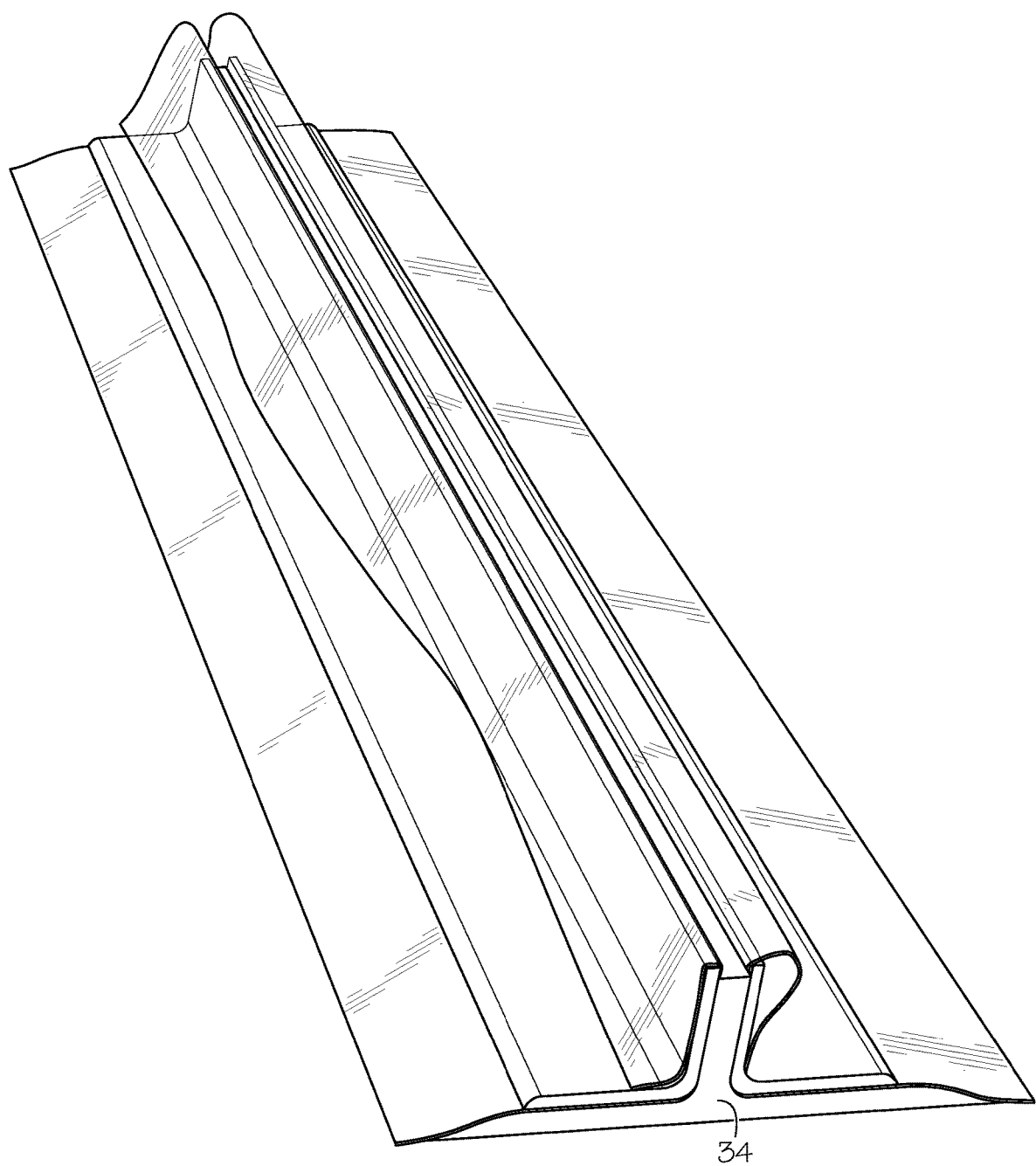
FIG. 11 is perspective view of an example of a blade stringer with angle caul tooling thereon.

FIGS. 5A, 6A and 7A illustrate example steps usable in some methods for the formation of cured composite structure 100 of FIG. 1. In the example of FIGS. 5A, 6A and 7A, multiple first stringers 120 and multiple second stringers 140 are shown. However, in other examples, more or fewer first stringers 120 and/or more or fewer second stringers 140 are possible. The example steps of FIGS. 5A, 6A and 7A will be described further below. FIGS. 5B, 6B, and 7B illustrate alternative example steps usable in some methods for the formation of cured composite structures. The example steps of FIGS. 5B, 6B and 7B will be described further below.

With reference to FIGS. 1, 5A and 6A, a first non-limiting example of a first method for manufacturing a cured composite structure 100 includes, for each first stringer 120 of the one or more first stringers 120, supporting the first stringer 120 (see also FIG. 12A) on the first side 162 of the panel 160 using a substantially rigid mandrel 130. A mandrel may be considered to be substantially rigid if the loads to which it is subject during use do not cause it to deform beyond the tolerance range to which it is manufactured. Therefore, the substantially rigid mandrel 130 is positioned within a first cavity 192 (see FIG. 12A) defined between the first stringer 120 and the first side 162 of the panel 160.

Referring now to FIGS. 1, 6A and 7A, the first non-limiting example of the first method for manufacturing a cured composite structure 100 further includes, for each second stringer of the one or more second stringers 140, supporting the second stringer 140 on the second side 166 of the panel 160 using a flexible mandrel 150. Therefore, the flexible mandrel 150 is positioned within a second cavity 194 defined between the second stringer 140 and the second side 166 of the panel 160 (see FIG. 13).

Figure 19:
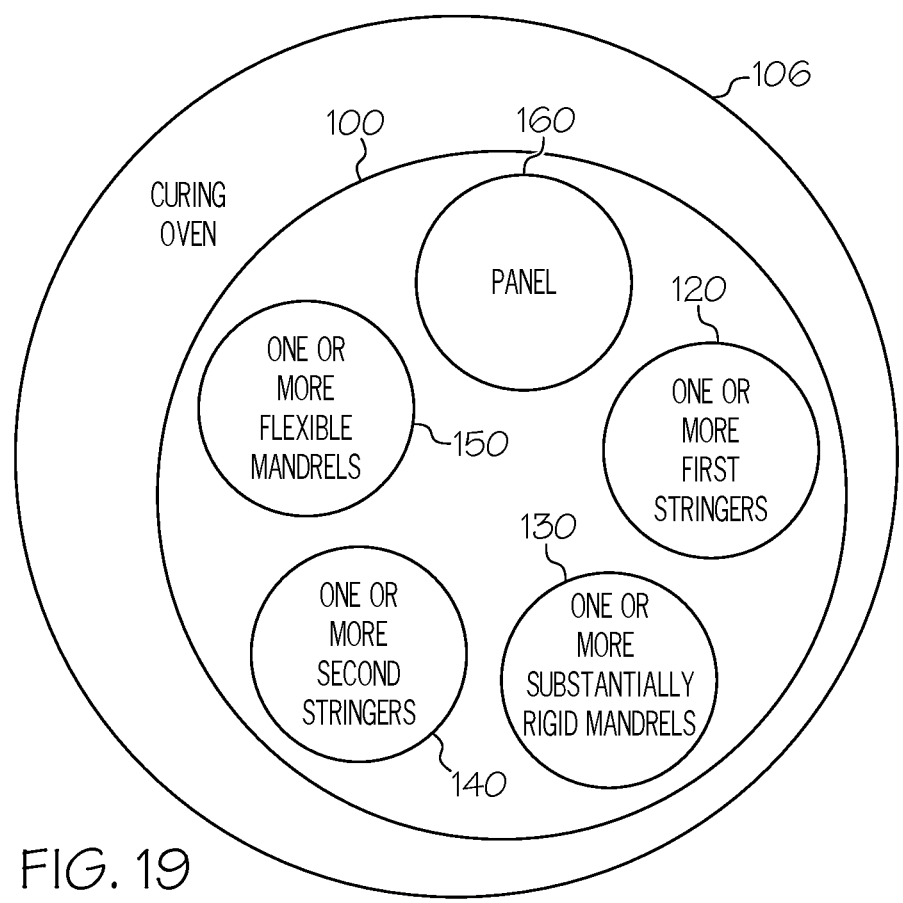
FIG. 19 is a block diagram showing a system for manufacturing a cured composite structure.

As shown in FIG. 19, for example, the first non-limiting example of the first method for manufacturing a cured composite structure 100 further includes co-curing (e.g., in oven 106) the one or more first stringers 120, the panel 160, and the one or more second stringers 140 while each of the one or more first stringers 120 are supported by the respective substantially rigid mandrel 130 and each of the one or more second stringers 140 are supported by the respective flexible mandrel 150.

With reference to FIGS. 1, 2 and 6A, in some aspects of the first method, the first side 162 of the panel 160 is substantially planar. A side may be considered to be substantially planar for these purposes if it meets the relevant manufacturing and engineering tolerancing standards for being planar. Without limitation, and referring particularly to FIGS. 14 and 15, in the latter first method, the second side 166 of the panel 160 is contoured. A contoured side optionally includes a smooth curved surface, a discontinuous surface, a stepped or terraced surface, or some combination thereof.

With reference to FIGS. 1, 5A, 6A and 7A, in some aspects of the first method, supporting the one or more first stringers 120 on the first side 162 further includes supporting the one or more first stringers 120 on the first side 162 of the panel 160 using a rigid tool 170 that defines one or more troughs 174 therein. The latter supporting the one or more first stringers 120 on the first side 162 of the panel 160 using a rigid tool 170 optionally includes the one or more first stringers 120 and the substantially rigid mandrel 130 being at least partially received in the one or more troughs 174 (see FIGS. 5A and 6A).

It should be understood that the present disclosure contemplates a first stringer 120 and the substantially rigid mandrel 130 being fully received in a trough 174 of the rigid tool 170, wherein the trough 174 fully support all parts of the first stringer 120 and the substantially rigid mandrel 130. It should be understood that the present disclosure also contemplates a first stringer 120 and the substantially rigid mandrel 130 being partially received in a trough 174, wherein one or more parts of the substantially rigid mandrel 130 or the first stringer 120 project from, or stick out from, or otherwise are not fully supported by the trough 174.

With reference now to FIGS. 7A and 13, the first method further includes supporting one or more second stringers 140 on the second side 166 of the panel 160 using a flexible mandrel 150. Therefore, the flexible mandrel 150 is positioned within a second cavity 194 defined between the second stringer 140 and the second side 166 of the panel 160.

In certain non-limiting aspects, such as that shown in FIG. 1, the rigid tool 170 includes a planar surface 172. In other certain non-limiting aspects, the rigid tool 170 includes a smooth curved surface, a discontinuous surface, a stepped or terraced surface, or some combination thereof. In certain non-limiting aspects the rigid tool 170 includes a surface which is the negative of, that is, adapted to mate up with and conform to, the first side 162 of the panel 160. For example and without limitation, in those examples in which the first side 162 of the panel 160 is a planar surface, the rigid tool 170 includes a surface which is a mating planar surface.

As described above, and with reference to FIGS. 5A, 6A, 7A and 19, this example first method includes co-curing the one or more first stringers 120, the panel 160, and the one or more second stringers 140 while each of the one or more first stringers 120 are supported by the respective substantially rigid mandrel 130 and each of the one or more second stringers 140 are supported by the respective flexible mandrel 150. Some aspects of the first example further includes removing the substantially rigid mandrel 130 and the flexible mandrel 150 from the cured composite structure 100 (See FIG. 22, block 240).

Figure 12A:
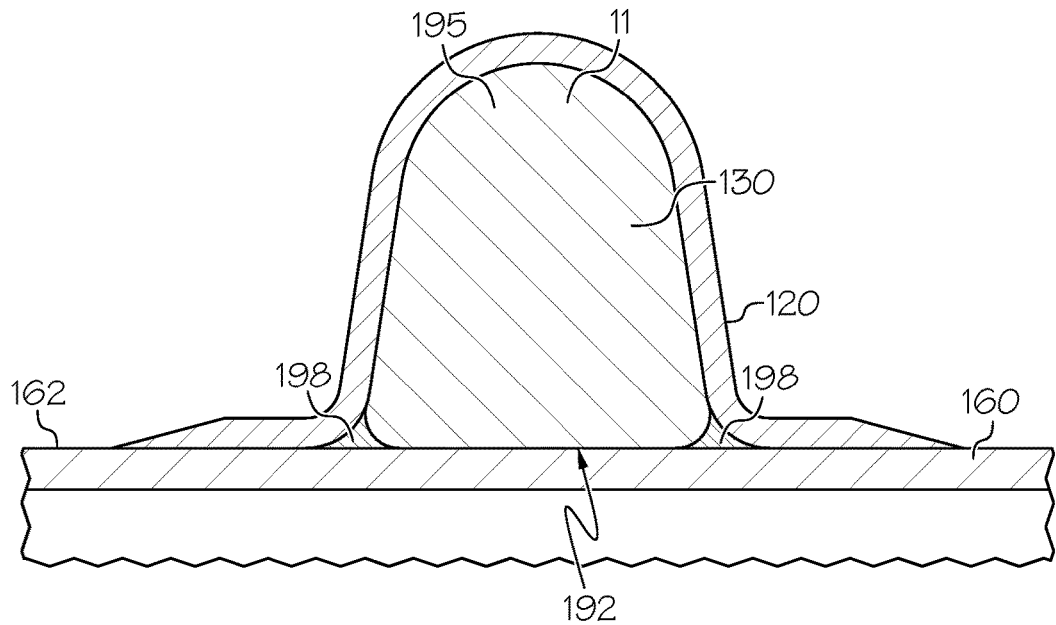
FIG. 12A is a section view of an example of a mandrel in a cavity defined between a stringer and a panel.
Figure 20A:
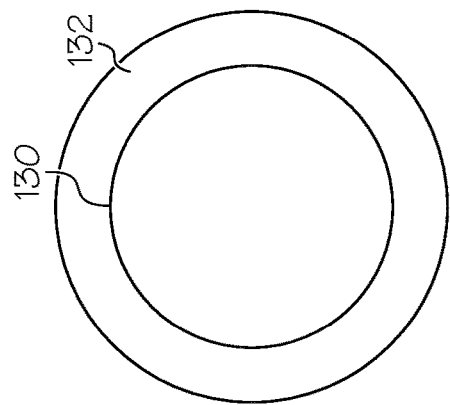
FIG. 20A is a block diagram showing a mandrel and a first volume.
Figure 20B:
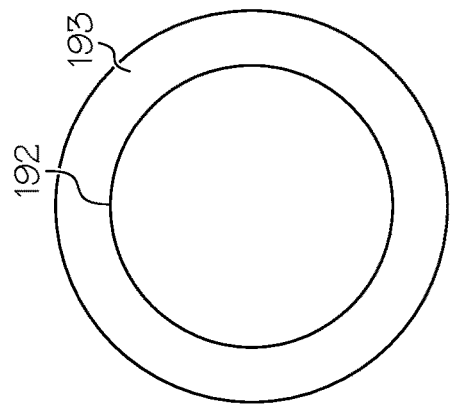
FIG. 20B is a block diagram showing a cavity and a second volume.

Referring now to FIGS. 12A, 20A and 20B, in some aspects of the first method, during the co-curing, the substantially rigid mandrel 130 expands by a first volume 132, and the first cavity 192 expands by a second volume 193. In some non-limiting aspects of the first method in which during the co-curing the substantially rigid mandrel 130 expands by a first volume 132, and the first cavity 192 expands by a second volume 193, the first volume 132 is substantially the same as the second volume 193. In some non-limiting aspects of the first method in which during the co-curing the substantially rigid mandrel 130 expands by a first volume 132, and the first cavity 192 expands by a second volume 193, the first volume 132 is between about 95 percent and about 105 percent of the second volume 193, or the first volume 132 is between about 90 percent and about 110 percent of the second volume 193, or the first volume 132 is between about 85 percent and about 115 percent of the second volume 193, or the first volume 132 is between about 80 percent and about 120 percent of the second volume 193, or the first volume 132 is between about 75 percent and about 125 percent of the second volume 193, or the first volume 132 is between about 70 percent and about 130 percent of the second volume 193.

Figure 20C:
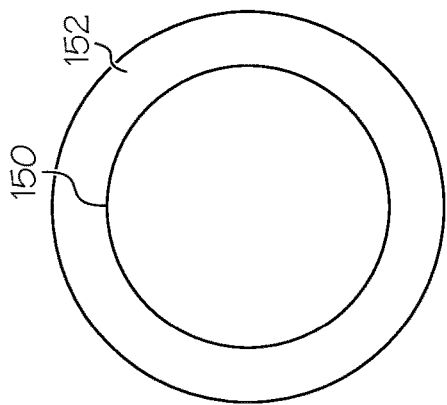
FIG. 20C is a block diagram showing a mandrel and a first volume.
Figure 20D:
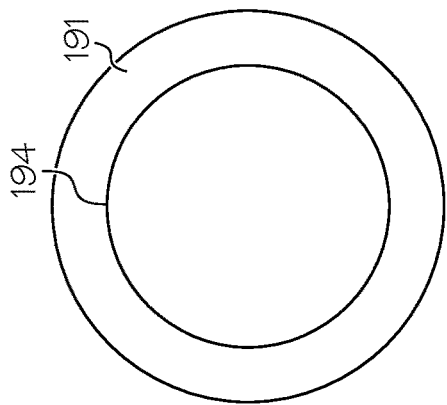
FIG. 20D is a block diagram showing a cavity and a second volume.
Figure 21A:
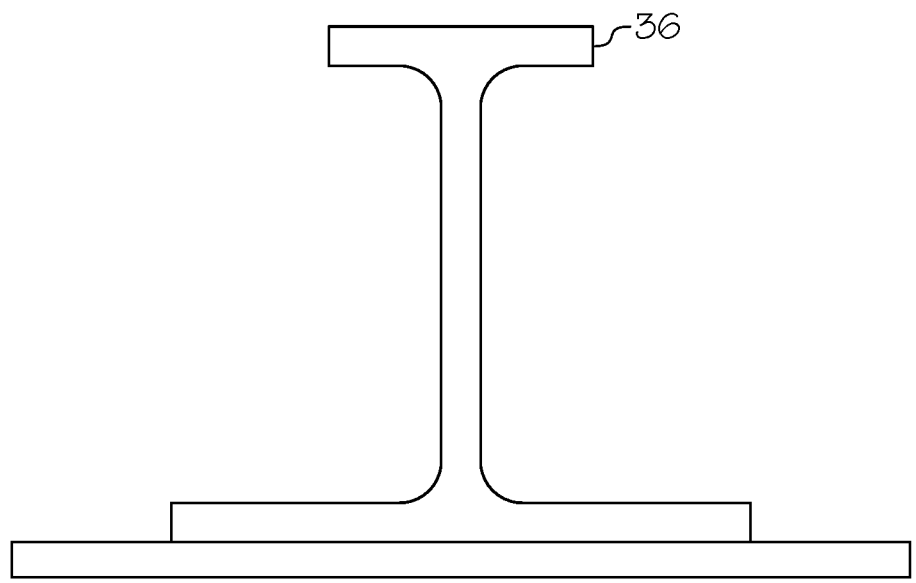
FIG. 21A is a section view of an I-stringer.
Figure 21B:
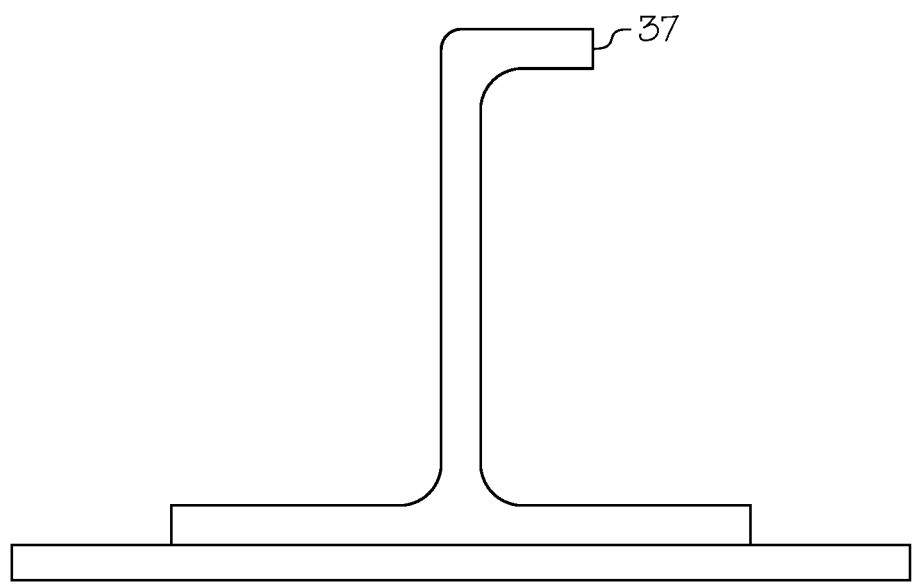
FIG. 21B is a section view of a J-stringer.

Referring now to FIGS. 13, 20C and 20D, in some aspects of the first method, during the co-curing, the flexible mandrel 150 expands by a first volume 152, and the second cavity 194 expands by a second volume 191. In some non-limiting aspects of the first method in which during the co-curing the flexible mandrel 150 expands by a first volume 152, and the second cavity 194 expands by a second volume 191, the first volume 152 is substantially the same as the second volume 191. In some non-limiting aspects of the first method in which during the co-curing the flexible mandrel 150 expands by a first volume 152, and the second cavity 194 expands by a second volume 191, the first volume 152 is between about 95 percent and about 105 percent of the second volume 191, or wherein the first volume 152 is between about 90 percent and about 110 percent of the second volume 191, or wherein the first volume 152 is between about 85 percent and about 115 percent of the second volume 191, or wherein the first volume 152 is between about 80 percent and about 120 percent of the second volume 191, or wherein the first volume 152 is between about 75 percent and about 125 percent of the second volume 191, or wherein the first volume 152 is between about 70 percent and about 130 percent of the second volume 191.

With reference now to FIGS. 1, 5A, 6A and 7A, and as mentioned above, in the first method, one or more first stringers 120 are supported on the first side 162 of the panel 160 using a substantially rigid mandrel 130, and one or more second stringers 140 are supported on the second side 166 of the panel 160 using a flexible mandrel 150. Within examples, a single first stringer 120 is supported on the first side 162 of the panel 160 using a substantially rigid mandrel 130 and/or a single second stringer 140 is supported on the second side 166 of the panel 160 using a flexible mandrel 150. However, in other examples, a plurality of stringers are supported on both sides. For instance, with continued reference to FIGS. 1, 5A and 7A, some aspects of the first method further include supporting a first plurality of stringers 30 (see FIG. 5A) on the first side 162 of the panel 160, wherein the first plurality of stringers 30 includes the one or more first stringers 120; and supporting a second plurality of stringers 32 (see FIG. 7A) on the second side 166 of the panel 160, wherein the second plurality of stringers 32 includes the one or more second stringers 140.

With reference to FIGS. 3, 4, 11, 17, 21A and 21B, in some non-limiting aspects of the first method at least one of the first plurality of stringers 30 and the second plurality of stringers 32 further includes a blade stringer 34 (see FIG. 11), or an I-stringer 36 (see FIG. 21A), or a J-stringer 37 (see FIG. 21B), or some combination thereof. FIG. 3 illustrates an example where the second plurality of stringers 32 includes blade stringers 34.

Figure 22:
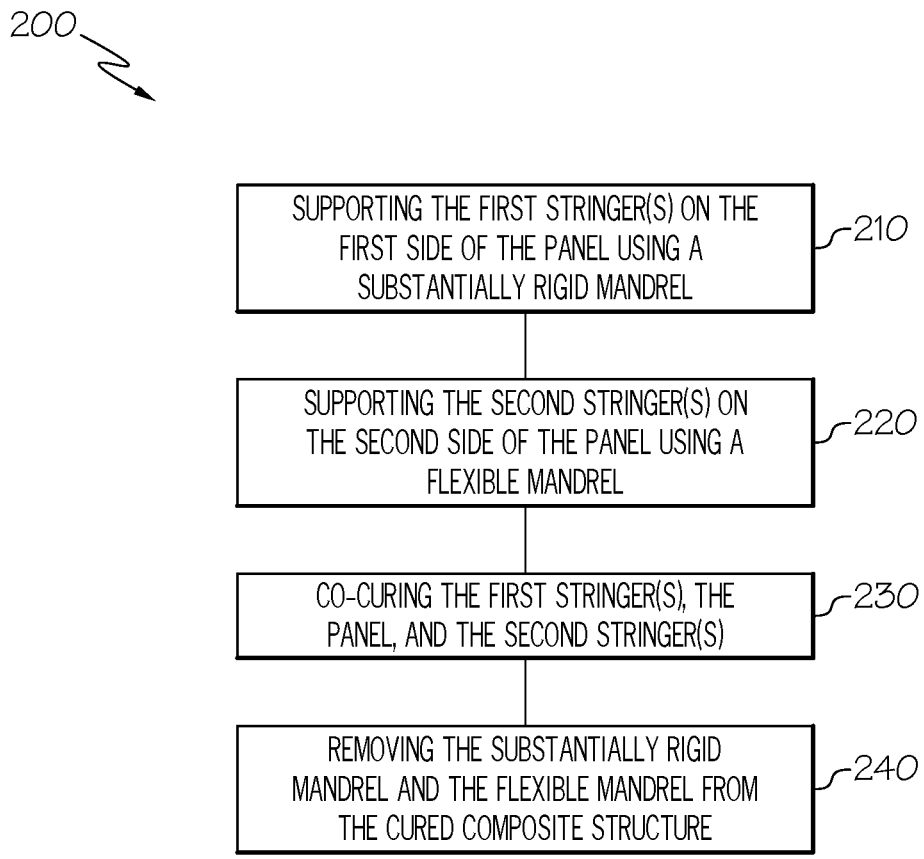
FIG. 22 is a flow diagram depicting one example of the disclosed method for manufacturing cured composite structures.

The first method is further described with reference to FIG. 22. In FIG. 22, there is shown one example of the disclosed method 200 for manufacturing a cured composite structure 100. The method 200 employs one or more first stringers 120, one or more second stringers 140 and a panel 160, wherein the panel 160 includes a first side 162 and a second side 166 opposed from the first side 162.

At Block 210, the method 200 includes, for each first stringer of the one or more first stringers 120, supporting the first stringer 120 on the first side 162 of the panel 160 using a substantially rigid mandrel 130. As such, the substantially rigid mandrel 130 is positioned within a first cavity 192 defined between the first stringer 120 and the first side 162 of the panel 160.

At Block 220, the method 200 includes, for each second stringer of the one or more second stringers 140, supporting the second stringer 140 on the second side 166 of the panel 160 using a flexible mandrel 150. As such, the flexible mandrel 150 is positioned within a second cavity 194 defined between the second stringer 140 and the second side 166 of the panel 160.

At Block 230, the method 200 includes co-curing the one or more first stringers 120, the panel 160, and the one or more second stringers 140 while each of the one or more first stringers 120 are supported by the respective substantially rigid mandrel 130 and each of the one or more second stringers 140 are supported by the respective flexible mandrel 150.

At Block 240, the method 200 includes removing the substantially rigid mandrel 130 and the flexible mandrel 150 from the cured composite structure 100.

While FIG. 1 shows the first side 162 of panel 160 as substantially planar and the second side 166 as contoured, it should be understood that this is not the only aspect contemplated. As set out in more detail below, in some non-limiting alternative aspects to those described above in the first example, the first side 162 of the panel 160 is contoured and the second side 166 of the panel 160 is substantially planar.

As noted above, prior efforts to co-cure structures with stiffeners on both sides of a structure have resulted in defects in the center structure due to pressure imbalances at the stiffener intersections 110 that have, in turn, have caused the laminate to distort or wrinkle. The above recited first method helps to reduce, minimize, or prevent pressure imbalances at the stiffener intersections by providing dimensional constraint at both sides 162, 166 of the panel 160 of the structure 100 sufficient to support the structure 100 during co-curing and to provide the desired geometry, while on one side 166 providing flexibility sufficient to permit a slight freedom of change in dimension and/or geometry and thereby reduce, minimize, or prevent the distortion or wrinkling that would otherwise occur as a result of the above cited pressure imbalances. More specifically, the above recited first method helps to promote even pressure at the stiffener intersections 110 which promotes a center structure that has little or no distortion. During curing, the substantially rigid mandrel 130 on the rigid tool 170 reacts to varying forces of the autoclave and the thermal expansion growth of the flexible mandrel 150 to create a part with a small amount of acceptable lamination variation at stiffener intersections 110. It should also be understood that the substantially rigid mandrels 130 and the rigid tool 170 help to produce a desired surface at the stiffener intersections 110, while the flexible mandrels allow the second stringers 140 on the second side 166 follow the contours of the second side 166. The combination allows for design flexibility of the contoured side (e.g., height, amount of plies, drop off plies, location of stiffeners, type of stiffeners) without needing to change the rigid tool 170 for structures 100 having different contours/designs.

Referring once again to FIGS. 1, 5A and 6A, a non-limiting example of a second method for manufacturing a cured composite structure 100 includes using a rigid tool 170 that defines one or more troughs 174 therein, one or more first stringers 120, one or more second stringers 140, and a panel 160, the panel 160 includes a first side 162 and a second side 166 opposed from the first side 162. The second method includes, for each first stringer 120 of the one or more first stringers 120: (i) positioning the first stringer 120 on the rigid tool 170 such that the first stringer 120 is at least partially within a trough 174 of the one or more troughs and (ii) positioning a substantially rigid mandrel 130 on the first stringer 120 such that the substantially rigid mandrel 130 is at least partially within the trough 174 (see FIG. 5A). The second method further includes positioning the panel 160 over the one or more first stringers 120 and over the substantially rigid mandrel 130 such that the first side 162 of the panel 160 faces toward the one or more first stringers 120 and toward the substantially rigid mandrel 130, and the second side 166 of the panel 160 faces away from the one or more first stringers 120 and away from the substantially rigid mandrel 130 (see FIG. 6A). Therefore, the substantially rigid mandrel 130 is positioned within a first cavity 192 (see FIG. 12A) defined between the first stringer 120 and the first side 162 of the panel 160.

Referring now to FIGS. 7A and 13, the second method further includes, for each second stringer of the one or more second stringers, (i) positioning a flexible mandrel 150 on the second side 166 of the panel 160 and (ii) positioning the second stringer 140 over the flexible mandrel 150. Therefore, the flexible mandrel 150 is positioned within a second cavity 194 defined between the second stringer 140 and the second side 166 of the panel 160.

Figure 14:
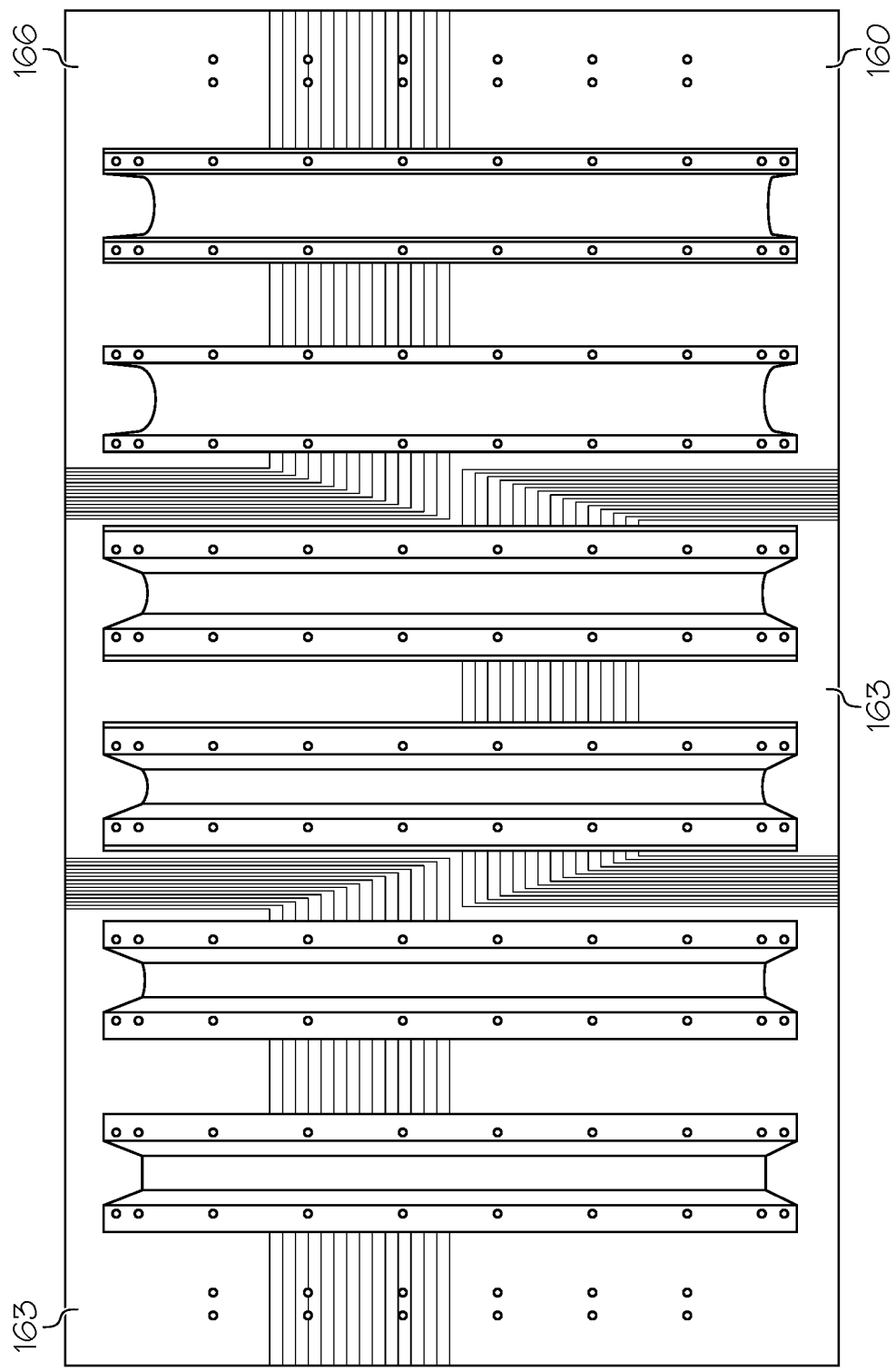
FIG. 14 is a plan view of an example of a set of stringers on one side of an opaque panel.
Figure 15:
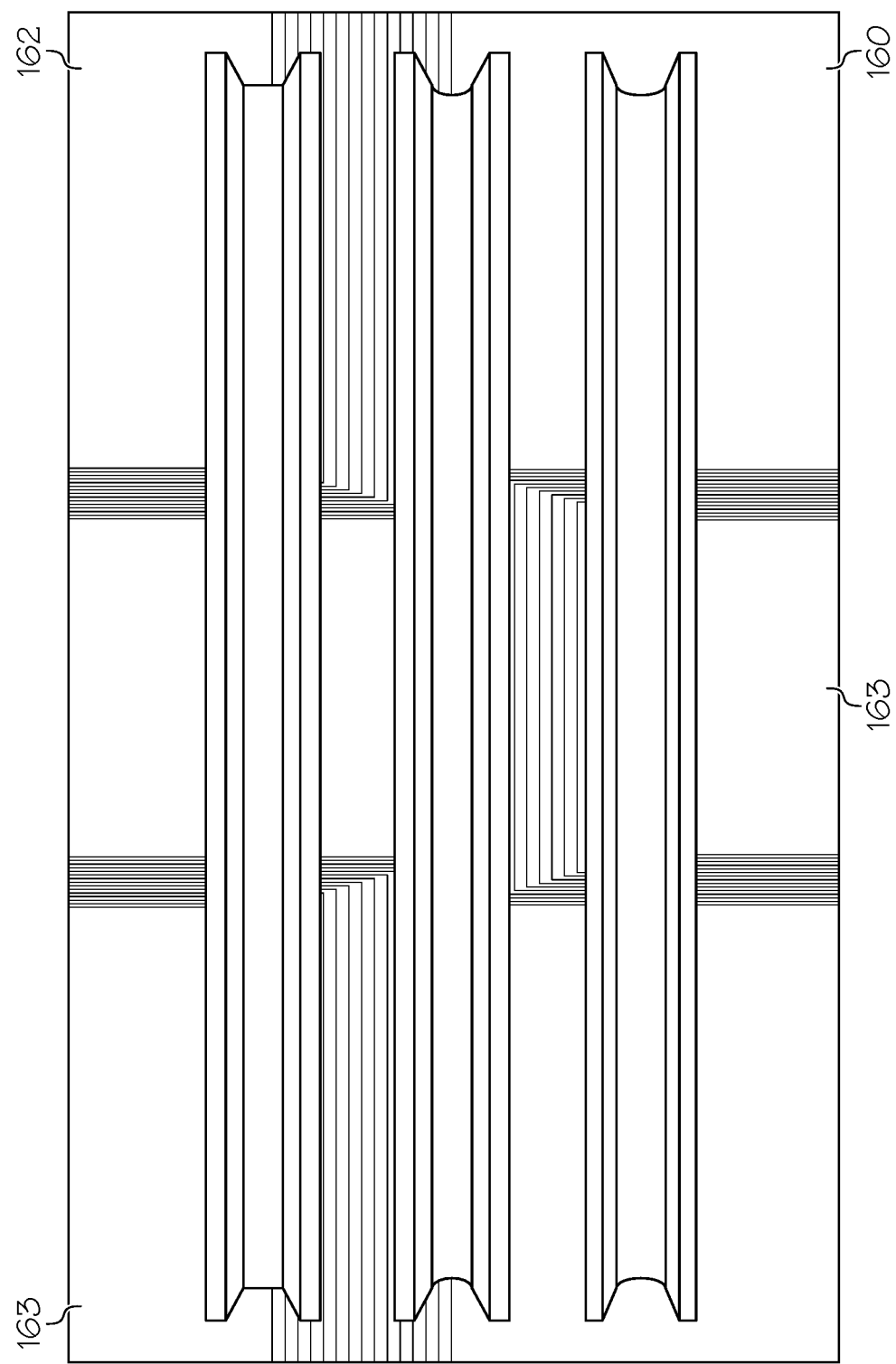
FIG. 15 is a plan view of an example of a set of stringers on one side of an opaque panel.

With reference to FIGS. 1, 14 and 15, without limitation, in some aspects of the second method, the second side 166 of the panel 160 is contoured. FIG. 6A depicts an aspect of the second method where the first side 162 of the panel 160 is substantially planar.

With reference to FIGS. 1, 6A, 14 and 15, some aspects of the second method include creating the panel 160 by laying up plies 163 over the one or more first stringers 120. With reference to FIGS. 6A, 14 and 15, and particularly to FIG. 6A, in some of the latter aspects, laying up plies 163 over the one or more first stringers 120 includes application of one or more plies 163 supported by the rigid tool 170 and at least one substantially rigid mandrel 130. As shown in FIG. 6A, in some aspects of the second method, the plies 163 are laid up to form substantially planar surfaces. As shown in FIGS. 14 and 15, in some aspects of the second method, the plies 163 are laid up to form contoured or terraced surfaces. Accordingly, this method is adapted to use the same rigid tool 170 successively to form multiple different shaped panels 160 be they flat planes (See FIG. 6A) or contoured (See FIGS. 14 and 15) or otherwise.

Figure 12B:
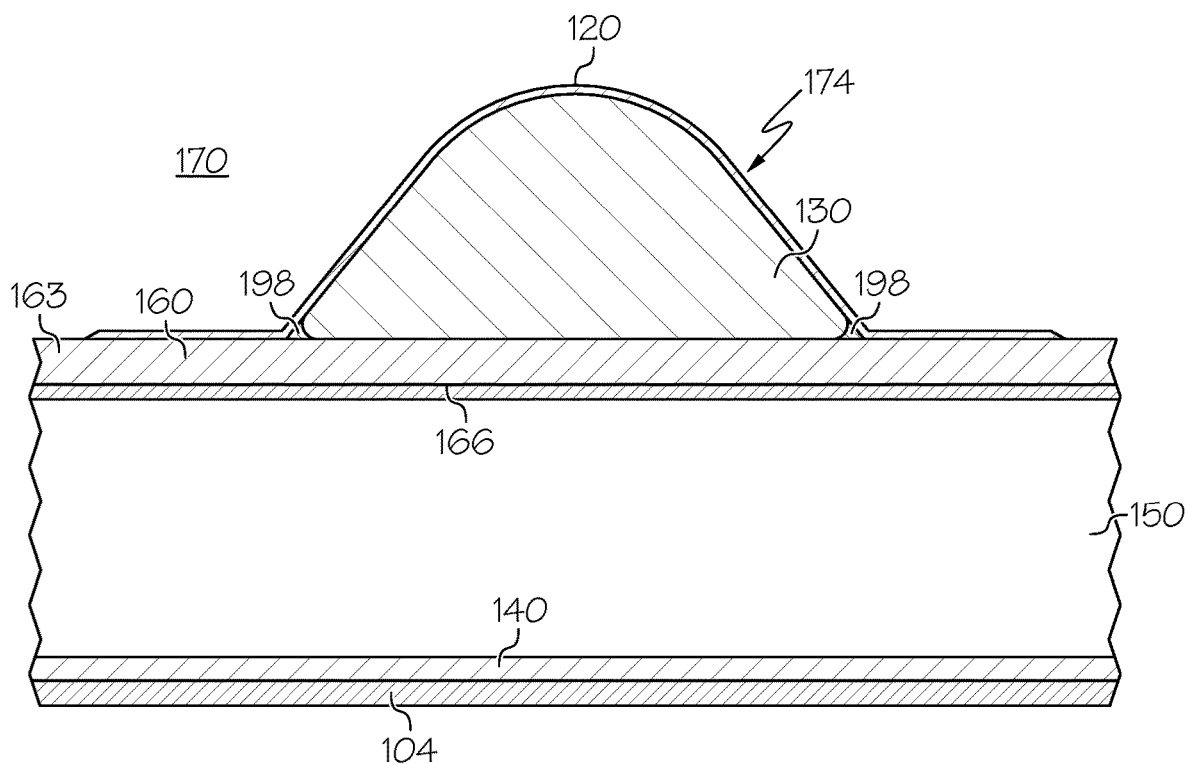
FIG. 12B is a section view of an example of a mandrel between a stringer and a panel.

With reference to FIGS. 5A, 7A, and 12B, some aspects of the second method include bagging the one or more first stringers 120, the substantially rigid mandrel 130, the panel 160, the flexible mandrel 150, and the one or more second stringers 140 in a vacuum bag 104. In FIGS. 5A and 7A, the vacuum bag 104 is illustrated as being transparent. Without limitation, some of the latter aspects of the second method further include at least partially vacuuming the vacuum bag 104. In some aspects, partially vacuuming the vacuum bag 104 includes vacuuming the vacuum bag 104 by pulling a vacuum on the vacuum bag 104 of a 0.1 of an atmosphere below atmospheric pressure; 0.2 of an atmosphere below atmospheric pressure; 0.3 of an atmosphere below atmospheric pressure; 0.4 of an atmosphere below atmospheric pressure; 0.5 of an atmosphere below atmospheric pressure; 0.6 of an atmosphere below atmospheric pressure; 0.7 of an atmosphere below atmospheric pressure; 0.8 of an atmosphere below atmospheric pressure; 0.9 of an atmosphere below atmospheric pressure; or a vacuum greater than 0.9 of an atmosphere below atmospheric pressure.

Without limitation, and with further reference to FIG. 19, some of the aspects of the second method further include co-curing (e.g., in oven 106) the one or more first stringers 120, the panel 160, and the one or more second stringers 140. Without limitation, some of the aspects of the second method which include the latter co-curing, further include for each first stringer, removing the substantially rigid mandrel 130; and for each second stringer, removing the flexible mandrel 150 (see FIG. 23, block 390).

Referring now to FIGS. 12A, 20A and 20B, and without limitation, some of the aspects of the second method which further include the above co-curing, also include, during the co-curing, the substantially rigid mandrel 130 expands by a first volume 132, and the first cavity 192 expands by a second volume 193. In some non-limiting aspects of the second method in which during the co-curing the substantially rigid mandrel 130 expands by a first volume 132, and the first cavity 192 expands by a second volume 193, the first volume 132 is substantially the same as the second volume 193. In some non-limiting aspects of the second method in which during the co-curing the substantially rigid mandrel 130 expands by a first volume 132, and the first cavity 192 expands by a second volume 193, the first volume 132 is between about 95 percent and about 105 percent of the second volume 193, or the first volume 132 is between about 90 percent and about 110 percent of the second volume 193, or the first volume 132 is between about 85 percent and about 115 percent of the second volume 193, or the first volume 132 is between about 80 percent and about 120 percent of the second volume 193, or the first volume 132 is between about 75 percent and about 125 percent of the second volume 193, or the first volume 132 is between about 70 percent and about 130 percent of the second volume 193.

Referring now to FIGS. 13, 20C and 20D, and without limitation, some of the aspects of the second method which further include the above co-curing, also include, during the co-curing, the flexible mandrel 150 expands by a first volume 152, and the second cavity 194 expands by a second volume 191. In some non-limiting aspects of the second method in which during the co-curing the flexible mandrel 150 expands by a first volume 152, and the second cavity 194 expands by a second volume 191, the first volume 152 is substantially the same as the second volume 191. In some non-limiting aspects of the second method in which during the co-curing the flexible mandrel 150 expands by a first volume 152, and the second cavity 194 expands by a second volume 191, the first volume 152 is between about 95 percent and about 105 percent of the second volume 191, or wherein the first volume 152 is between about 90 percent and about 110 percent of the second volume 191, or wherein the first volume 152 is between about 85 percent and about 115 percent of the second volume 191, or wherein the first volume 152 is between about 80 percent and about 120 percent of the second volume 191, or wherein the first volume 152 is between about 75 percent and about 125 percent of the second volume 191, or wherein the first volume 152 is between about 70 percent and about 130 percent of the second volume 191.

Referring now to FIGS. 12A and 12B, some non-limiting aspects of the systems and methods provided herein include inclusion of a radius filler 198 (also known as a noodle). A radius filler 198 includes a composite material and fills a margin between pieces of one or more composite component parts, such as, in FIGS. 12A and 12B, the margin between panel 160 and stringer 120. The radius filler 198 provides additional structural reinforcement local to the margin it fills and helps distribute local loads and forces.

Figure 23:
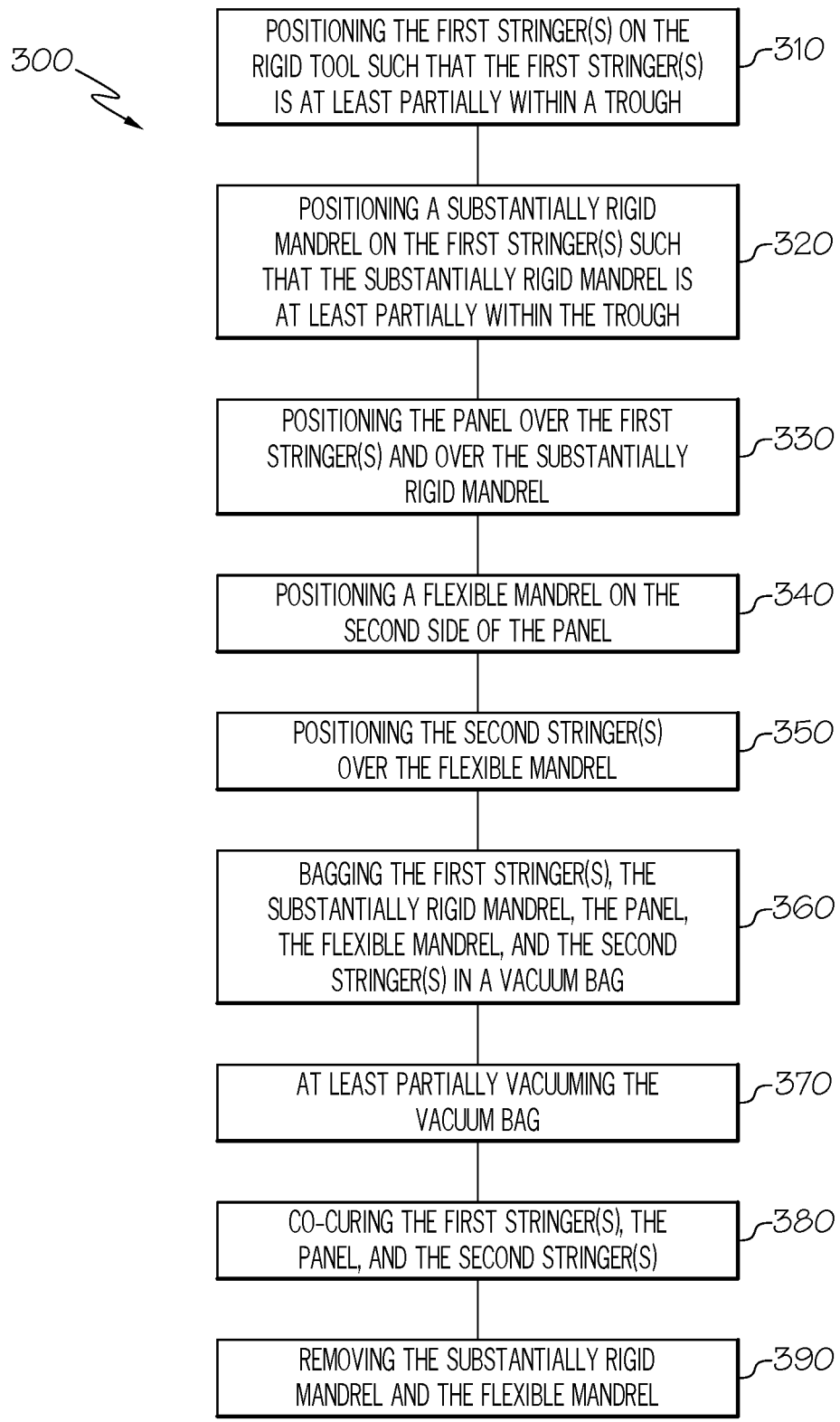
FIG. 23 is a flow diagram depicting another example of the disclosed method for manufacturing cured composite structures.

The second method is further described with reference to FIG. 23. In FIG. 23, there is shown another example of the disclosed method 300 for manufacturing a cured composite structure 100. The method 300 employs a rigid tool 170 that defines one or more troughs 174 therein, as well as one or more first stringers 120, one or more second stringers 140 and a panel 160, wherein the panel 160 includes a first side 162 and a second side 166 opposed from the first side 162.

At Block 310, the method 300 includes, for each first stringer 120 of the one or more first stringers 120, positioning the first stringer 120 on the rigid tool 170 such that the first stringer 120 is at least partially within a trough 174 of the one or more troughs.

At Block 320, the method 300 includes, for each first stringer 120 of the one or more first stringers 120, positioning a substantially rigid mandrel 130 on the first stringer 120 such that the substantially rigid mandrel 130 is at least partially within the trough 174.

At Block 330, the method 300 includes positioning the panel 160 over the one or more first stringers 120 and over the substantially rigid mandrel 130 such that the first side 162 of the panel 160 faces toward the one or more first stringers 120 and toward the substantially rigid mandrel 130, and the second side 166 of the panel 160 faces away from the one or more first stringers 120 and away from the substantially rigid mandrel 130.

At Block 340, the method 300 includes, for each second stringer of the one or more second stringers, positioning a flexible mandrel 150 on the second side 166 of the panel 160.

At Block 350, the method 300 includes, for each second stringer of the one or more second stringers, positioning the second stringer 140 over the flexible mandrel 150.

At Block 360, the method 300 includes bagging the one or more first stringers 120, the substantially rigid mandrel 130, the panel 160, the flexible mandrel 150, and the one or more second stringers 140 in a vacuum bag 104.

At Block 370, the method 300 includes at least partially vacuuming the vacuum bag 104.

At Block 380, the method 300 includes co-curing the one or more first stringers 120, the panel 160, and the one or more second stringers 140.

At Block 390, the method 300 includes removing the substantially rigid mandrel 130 and removing the flexible mandrel 150.

As noted above, prior efforts to co-cure structures with stiffeners on both sides of a structure have resulted in defects in the center structure due to pressure imbalances at the stiffener intersections that have, in turn, have caused the laminate to distort or wrinkle. The above recited second method helps to reduce, minimize, or prevent pressure imbalances at the stiffener intersections by providing dimensional constraint at both sides 162, 166 of the panel 160 of the structure 100 sufficient to support the structure 100 during co-curing and to provide the desired geometry, while on one side 166 providing flexibility sufficient to permit a slight freedom of change in dimension and/or geometry and thereby reduce, minimize, or prevent the distortion or wrinkling that would otherwise occur as a result of the above cited pressure imbalances. More specifically, the above recited second method helps to promote even pressure at the stiffener intersections 110 which promotes a center structure that has little or no distortion. During curing, the substantially rigid mandrel 130 on the rigid tool 170 reacts to varying forces of the autoclave and the thermal expansion growth of the flexible mandrel 150 to create a part with a small amount of acceptable lamination variation at stiffener intersections 110. It should also be understood that the substantially rigid mandrels 130 and the rigid tool 170 help to produce a desired surface at the stiffener intersections 110, while the flexible mandrels allow the second stringers 140 on the second side 166 follow the contours of the second side 166. The combination allows for design flexibility of the contoured side (e.g., height, amount of plies, drop off plies, location of stiffeners, type of stiffeners) without needing to change the rigid tool 170 for structures 100 having different contours/designs.

With reference to FIGS. 3, 5B, 6B and 7B, further provided is a non-limiting example of a third method for manufacturing a cured composite structure 100 using a rigid tool 170 that defines one or more troughs 174 therein, one or more first stringers 120, one or more second stringers 140, and a panel 160, the panel 160 including a first side 162 and a second side 166 opposed from the first side 162. The non-limiting example of a third method for manufacturing a cured composite structure 100 includes, for each first stringer 120 of the one or more first stringers 120, (i) positioning the first stringer 120 on the rigid tool 170 such that the first stringer 120 is at least partially within a trough of the one or more troughs 174 and (ii) positioning a flexible mandrel 150 on the first stringer 120 such that the flexible mandrel 150 is at least partially within the trough 174 (see FIG. 5B). The third method further includes positioning the panel 160 over the one or more first stringers 120 and over the flexible mandrel 150 such that the first side 162 of the panel 160 faces toward the one or more first stringers 120 and toward the flexible mandrel 150, and the second side 166 of the panel 160 faces away from the one or more first stringers 120 and away from the flexible mandrel 150 (see FIG. 6B). Referring now to FIG. 7B, the third method further includes, for each second stringer of the one or more second stringers, (i) positioning a substantially rigid mandrel 130 on the second side 166 of the panel 160 and (ii) positioning the second stringer 140 over the substantially rigid mandrel 130.

Without limitation, in some of the aspects of the third method, the first side 162 of the panel 160 is contoured and the second side 166 of the panel 160 is substantially planar. In certain non-limiting aspects of this example where the first side 162 of the panel 160 is contoured and the second side 166 of the panel 160 is substantially planar, the rigid tool 170 is contoured. For instance, the rigid tool 170 may include a smooth curved surface, a discontinuous surface, a stepped or terraced surface, or some combination thereof.

With reference to FIG. 6B, and without limitation, some of the aspects of the third method further include creating the panel 160 by laying up plies 163 over the one or more first stringers 120.

With reference to FIGS. 5B, 6B and 7B, and without limitation, some of the aspects of the third method further include bagging the one or more first stringers 120, the substantially rigid mandrel 130, the panel 160, the flexible mandrel 150, and the one or more second stringers 140 in a vacuum bag 104. In FIGS. 5B and 7B, the vacuum bag 104 is illustrated as being transparent. Without limitation, some of the aspects of the third example including the latter bagging further include at least partially vacuuming the vacuum bag 104. In some aspects, partially vacuuming the vacuum bag 104 includes vacuuming the vacuum bag 104 by pulling a vacuum on the vacuum bag 104 of a 0.1 of an atmosphere below atmospheric pressure; 0.2 of an atmosphere below atmospheric pressure; 0.3 of an atmosphere below atmospheric pressure; 0.4 of an atmosphere below atmospheric pressure; 0.5 of an atmosphere below atmospheric pressure; 0.6 of an atmosphere below atmospheric pressure; 0.7 of an atmosphere below atmospheric pressure; 0.8 of an atmosphere below atmospheric pressure; 0.9 of an atmosphere below atmospheric pressure; or a vacuum greater than 0.9 of an atmosphere below atmospheric pressure.

Without limitation, some of the aspects of the third example including the latter vacuuming further include co-curing the one or more first stringers 120, the panel 160, and the one or more second stringers 140. Without limitation, some of the aspects of the third example including the latter co-curing further include for each first stringer, removing the flexible mandrel 150; and for each second stringer, removing the substantially rigid mandrel 130 (see FIG. 24, block 490).

Referring now to FIGS. 20A and 20B, and without limitation, in some of the aspects of the third example including the latter co-curing, during the co-curing the substantially rigid mandrel 130 expands by a first volume 132, and the first cavity 192 expands by a second volume 193. In some non-limiting aspects of the latter method in which during the co-curing the substantially rigid mandrel 130 expands by a first volume 132, and the first cavity 192 expands by a second volume 193, the first volume 132 is substantially the same as the second volume 193. In some non-limiting aspects of the latter method in which during the co-curing the substantially rigid mandrel 130 expands by a first volume 132, and the first cavity 192 expands by a second volume 193, the first volume 132 is between about 95 percent and about 105 percent of the second volume 193, or the first volume 132 is between about 90 percent and about 110 percent of the second volume 193, or the first volume 132 is between about 85 percent and about 115 percent of the second volume 193, or the first volume 132 is between about 80 percent and about 120 percent of the second volume 193, or the first volume 132 is between about 75 percent and about 125 percent of the second volume 193, or the first volume 132 is between about 70 percent and about 130 percent of the second volume 193.

Referring now to FIGS. 20C and 20D, and without limitation, some of the aspects of the third method which further include the above co-curing, also include, during the co-curing, the flexible mandrel 150 expands by a first volume 152, the second cavity 194 expands by a second volume 191. In some non-limiting aspects of the latter method in which during the co-curing the flexible mandrel 150 expands by a first volume 152, and the second cavity 194 expands by a second volume 191, the first volume 152 is substantially the same as the second volume 191. In some non-limiting aspects of the latter method in which during the co-curing the flexible mandrel 150 expands by a first volume 152, and the second cavity 194 expands by a second volume 191, the first volume 152 is between about 95 percent and about 105 percent of the second volume 191, or wherein the first volume 152 is between about 90 percent and about 110 percent of the second volume 191, or wherein the first volume 152 is between about 85 percent and about 115 percent of the second volume 191, or wherein the first volume 152 is between about 80 percent and about 120 percent of the second volume 191, or wherein the first volume 152 is between about 75 percent and about 125 percent of the second volume 191, or wherein the first volume 152 is between about 70 percent and about 130 percent of the second volume 191.

Figure 24:
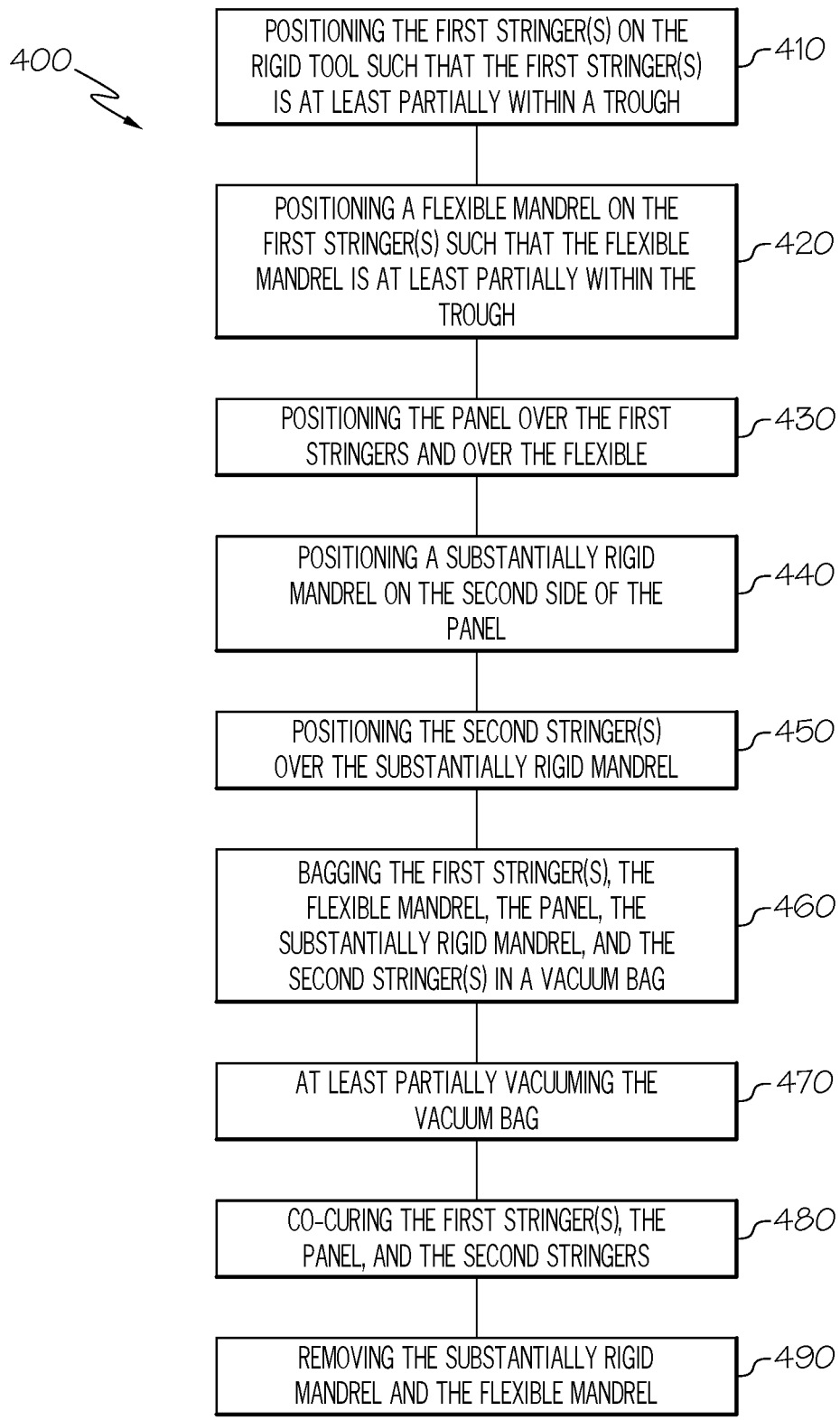
FIG. 24 is a flow diagram depicting yet another example of the disclosed method for manufacturing cured composite structures.

The third example is further described with reference to FIG. 24. In FIG. 24, there is shown another example of the disclosed method 400 for manufacturing a cured composite structure 100. The method 400 employs a rigid tool 170 that defines one or more troughs 174 therein, as well as one or more first stringers 120, one or more second stringers 140 and a panel 160, wherein the panel 160 includes a first side 162 and a second side 166 opposed from the first side 162.

At Block 410, the method 400 includes, for each first stringer 120 of the one or more first stringers 120, positioning the first stringer 120 on the rigid tool 170 such that the first stringer 120 is at least partially within a trough 174 of the one or more troughs.

At Block 420, the method 400 includes, for each first stringer 120 of the one or more first stringers 120, positioning a flexible mandrel 150 on the first stringer 120 such that the flexible mandrel 150 is at least partially within the trough 174.

At Block 430, the method 400 includes positioning the panel 160 over the one or more first stringers 120 and over the flexible mandrel 150 such that the first side 162 of the panel 160 faces toward the one or more first stringers 120 and toward the flexible mandrel 150, and the second side 166 of the panel 160 faces away from the one or more first stringers 120 and away from the flexible mandrel 150.

At Block 440, the method 400 includes, for each second stringer of the one or more second stringers, positioning a substantially rigid mandrel 130 on the second side 166 of the panel 160.

At Block 450, the method 400 includes, for each second stringer of the one or more second stringers, positioning the second stringer 140 over the substantially rigid mandrel 130.

At Block 460, the method 400 includes bagging the one or more first stringers 120, the flexible mandrel 150, the panel 160, the substantially rigid mandrel 130, and the one or more second stringers 140 in a vacuum bag 104.

At Block 470, the method 400 includes at least partially vacuuming the vacuum bag 104.

At Block 480, the method 400 includes co-curing the one or more first stringers 120, the panel 160, and the one or more second stringers 140.

At Block 490, the method 400 includes removing the substantially rigid mandrel 130 and removing the flexible mandrel 150.

The above recited third method provides quality improvements for the stringers 140 on the second side 166 of the panel 160 when the stringers 140 are cured on substantially rigid mandrels 130 that are straight. Further, the third method helps to reduce, minimize, or prevent pressure imbalances at the stiffener intersections by providing dimensional constraint at both sides 162, 166 of the panel 160 of the structure 100 sufficient to support the structure 100 during co-curing and to provide the desired geometry. Still further, the third method allows for the first side 162 of the panel 160 to be contoured based on the design of the rigid tool 170 (e.g., smooth curved surface, a discontinuous surface, a stepped or terraced surface, or some combination thereof). The flexible mandrels 150 can be placed in the rigid tool 170 to accommodate the design of the rigid tool.

With reference to FIGS. 1, 3 and 19, further provided is a first non-limiting example of a system for manufacturing a cured composite structure 100 including a panel 160 having a first side 162 and a second side 166 opposed from the first side 162, one or more first stringers 120 connected to the first side 162, and one or more second stringers 140 connected to the second side 166. The first non-limiting example of a system includes one or more substantially rigid mandrels 130, with each substantially rigid mandrel 130 positioned within a first cavity 192 defined between a first stringer 120 of the one or more first stringers 120 and the first side 162 of the panel 160. The first non-limiting example of a system includes one or more flexible mandrels 150, with each flexible mandrel 150 positioned within a second cavity 194 defined between a second stringer 140 of the one or more second stringers 140 and the second side 166 of the panel 160. The first non-limiting example of a system includes a curing oven 106 configured to receive therein the panel 160, the one or more first stringers 120, the one or more second stringers 140, the one or more substantially rigid mandrels 130, and the one or more flexible mandrels 150.

Without limitation, in some of the aspects of the first example of a system, the first side 162 of the panel 160 is substantially planar. Without limitation, in some of the aspects of the first example of a system in which the first side 162 of the panel 160 is substantially planar, the second side 166 of the panel 160 is contoured.

Figure 16:
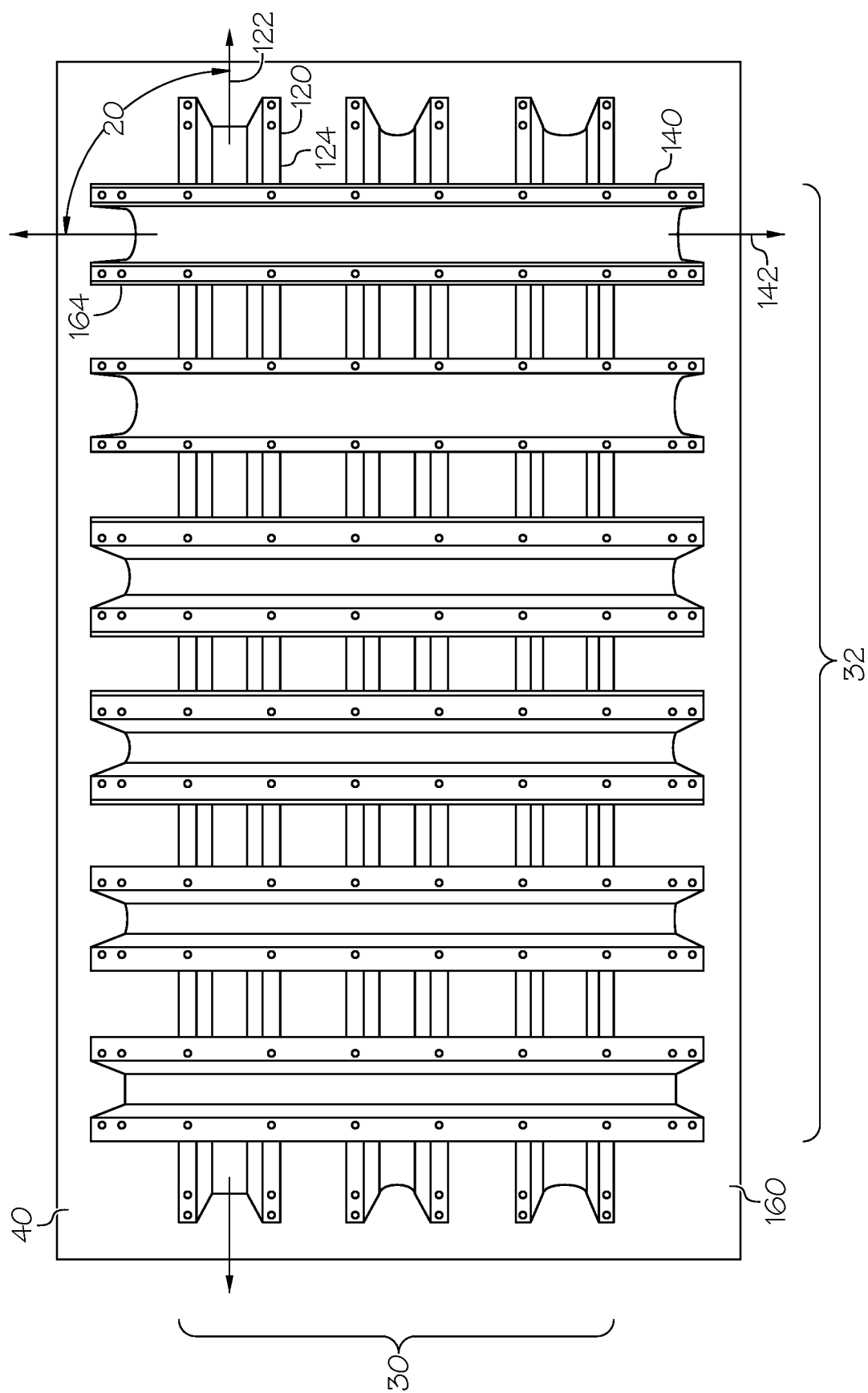
FIG. 16 is a plan view of an example of a transparent panel having a first side with a first set of stringers thereon and a second side opposite the first side with a second set of stringers on the second side.
Figure 17:
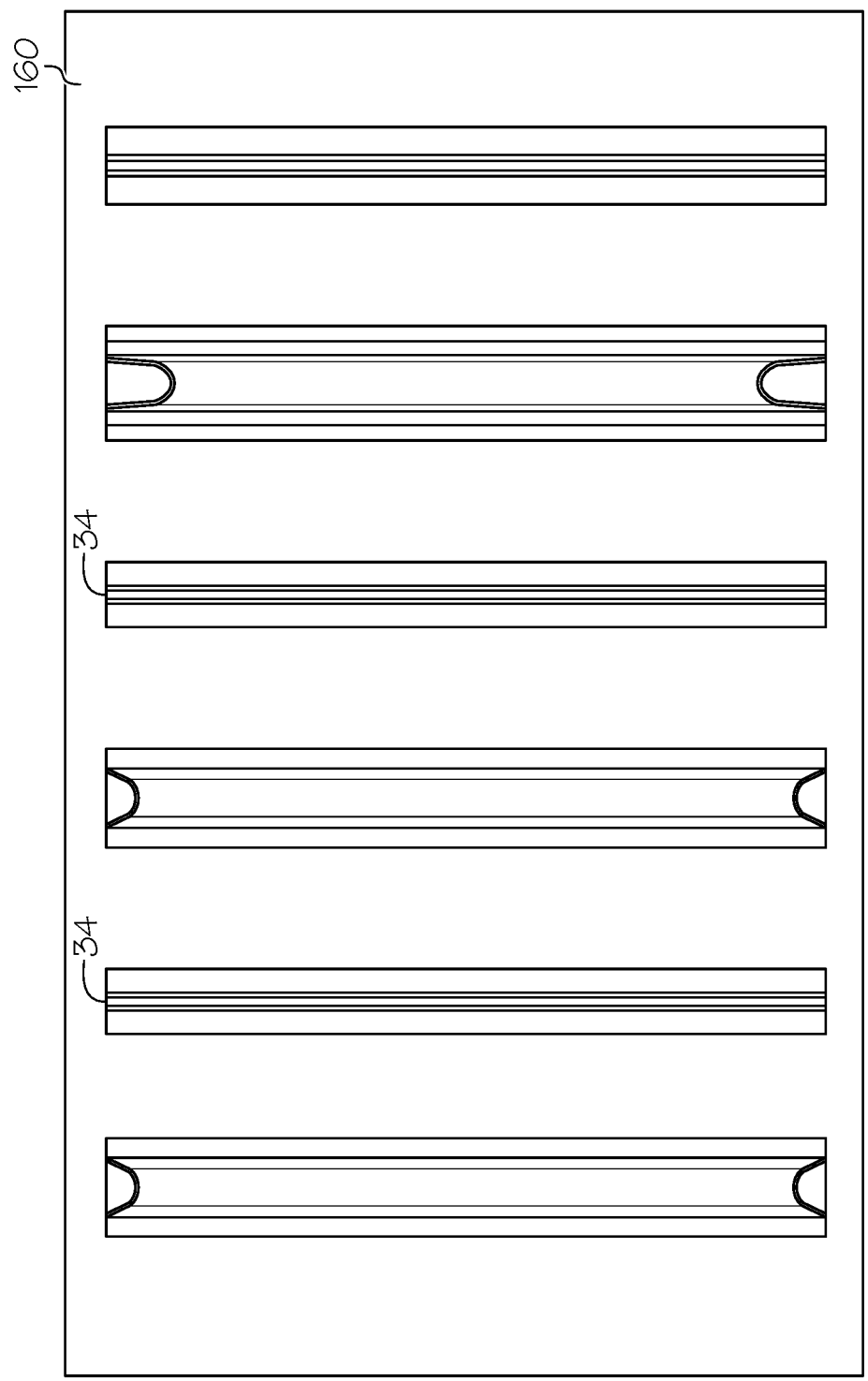
FIG. 17 is a plan view of an example of a set of stringers including both hat stringers and blade stingers on one side of an opaque panel.
Figure 18:
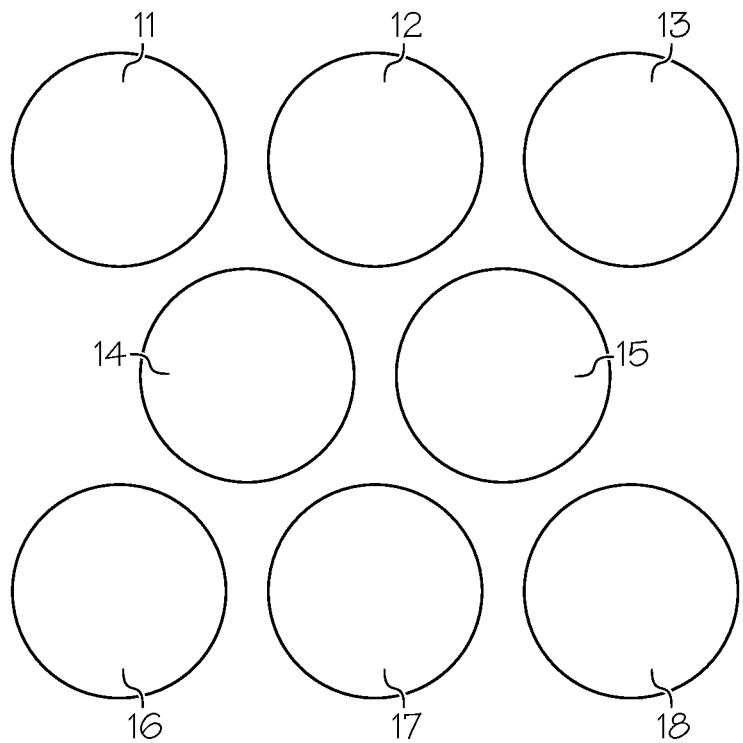
FIG. 18 is a block diagram showing a variety of different materials.

With reference to FIG. 16, in some aspects of the above methods and systems, the one or more first stringers 120 are elongated and define a first path of elongation 122. In these latter aspects of the above methods and systems, optionally, the one or more second stringers 140 are also elongated and define a second path of elongation 142. In some non-limiting aspects of the above methods and systems in which the one or more first stringers 120 are elongated and define a first path of elongation 122, and the one or more second stringers 140 are elongated and define a second path of elongation 142, the first path of elongation 122 intersects the second path of elongation 142. In some non-limiting aspects of the above methods and systems in which the first path of elongation 122 intersects the second path of elongation 142, the first path of elongation 122 is at an angle 20 relative to the second path of elongation 142. In some non-limiting aspects of the above methods and systems in which the first path of elongation 122 is at an angle 20 relative to the second path of elongation 142, the angle 20 is between about 10 degrees and about 170 degrees, or between about 20 degrees and about 160 degrees, or between about 30 degrees and about 150 degrees, or between about 40 degrees and about 140 degrees, or between about 50 degrees and about 130 degrees, or between about 60 degrees and about 120 degrees, or between about 70 degrees and about 110 degrees, or between about 80 degrees and about 100 degrees. In some non-limiting aspects of the above methods and systems in which the first path of elongation 122 is at an angle 20 relative to the second path of elongation 142, the angle 20 is approximately 90 degrees. For instance, in the example of FIG. 16, the first path of elongation 122 is at an angle 20 relative to the second path of elongation 142 of 90 degrees. In some non-limiting aspects of the above methods and systems in which the one or more first stringers 120 are elongated and define a first path of elongation 122, and the one or more second stringers 140 are elongated and define a second path of elongation 142, a projection of the first path of elongation 122 onto an imaginary view plane 40, and a projection of the second path of elongation 142 onto the imaginary view plane 40 intersect at an angle 20. In some aspects, this angle 20 is between about 10 degrees and about 170 degrees, or between about 20 degrees and about 160 degrees, or between about 30 degrees and about 150 degrees, or between about 40 degrees and about 140 degrees, or between about 50 degrees and about 130 degrees, or between about 60 degrees and about 120 degrees, or between about 70 degrees and about 110 degrees, or between about 80 degrees and about 100 degrees, or is approximately 90 degrees.

With reference to FIGS. 1-4, and in particular to FIG. 2, in some aspects of the above methods and systems, the one or more first stringers 120 include a first composite material 124, the panel 160 includes a second composite material 144, and the one or more second stringers 140 include a third composite material 164. In certain non-limiting aspects of this latter aspect of the above methods and systems, the first composite material 124 is the same as the second composite material 144, or the first composite material 124 is the same as the third composite material 164, or the second composite material 144 is the same as the third composite material 164, or some combination thereof. As used herein, materials are substantially the same for a given purpose if the differences between them are sufficiently minor that they are interchangeable for that given purpose.

In some aspects of the above methods and systems, the substantially rigid mandrel 130 has a coefficient of thermal expansion between about 86 μm/(m·K) and about 160 μm/(m·K), or a coefficient of thermal expansion between about 50 μm/(m·K) and about 190 μm/(m·K), or a coefficient of thermal expansion between about 60 μm/(m·K) and about 180 μm/(m·K), or a coefficient of thermal expansion between about 70 μm/(m·K) and about 170 μm/(m·K), or a coefficient of thermal expansion between about 80 μm/(m·K) and about 160 μm/(m·K), or a coefficient of thermal expansion between about 90 μm/(m·K) and about 150 μm/(m·K), or a coefficient of thermal expansion between about 100 μm/(m·K) and about 140 μm/(m·K), or a coefficient of thermal expansion between about 110 μm/(m·K) and about 130 μm/(m·K), or a coefficient of thermal expansion of about 120 μm/(m·K). With reference now to FIG. 13, in some non-limiting aspects in which the coefficient of thermal expansion of the flexible mandrel 150 differs from that of the second stringer 140 such that, after curing, there is a gap 197 between the flexible mandrel 150 and the second stringer 140.

In some aspects of the above methods and systems, the substantially rigid mandrel 130 has a tensile modulus of at least about 35 MPa, or a tensile modulus of at least about 50 MPa, or a tensile modulus of at least about 100 MPa, or a tensile modulus of at least about 500 MPa, or a tensile modulus of at least about 1000 MPa, or a tensile modulus of at least about 5000 MPa, or a tensile modulus of at least about 10,000 MPa, or a tensile modulus of at least about 50,000 MPa, or a tensile modulus of at least about 100,000 MPa. These above examples of the tensile modulus of the substantially rigid mandrel 130 are not limiting: the tensile modulus of the substantially rigid mandrel 130 should be selected using good engineering judgment.

In examples of the above methods and systems, the substantially rigid mandrel 130 may be formed from various material or materials. For instance, in some aspects of the above methods and systems, the substantially rigid mandrel 130 includes foam 195, polymethacrylimide 11, or polymethacrylimide 11 foam 195. In some aspects of the above methods and systems, the substantially rigid mandrel 130 includes at least one of polytetrafluoroethylene 12, solid fluorinated ethylene propylene 13, silicone with glass, nylon 16, and a combination thereof. In some aspects of the above methods and systems, the substantially rigid mandrel 130 includes aluminum, iron, steel, bronze, brass, copper, titanium, or some combination thereof. In some aspects where it is used as part of a substantially rigid mandrel 130, silicone with glass refers to silicone with more than 35% glass 17.

In examples of the above methods and systems, the flexible mandrel 150 may be formed from various material or materials. For instance, in some aspects of the above methods and systems, the flexible mandrel 150 includes an elastomeric material 196. In some aspects of the above methods and systems, the flexible mandrel 150 has an elastic modulus of less than 30 MPa, or an elastic modulus of less than 25 MPa, or an elastic modulus of less than 20 MPa, or an elastic modulus of less than 15 MPa, or an elastic modulus of less than 10 MPa, or an elastic modulus of less than 5 MPa. These above examples of the tensile modulus of the flexible mandrel 150 are not limiting: the tensile modulus of the flexible mandrel 150 should be selected using good engineering judgment. In some aspects of the above methods and systems, the flexible mandrel 150 is solid. In some aspects of the above methods and systems, the flexible mandrel 150 is foam. In some aspects of the above methods and systems, the flexible mandrel 150 includes ethylene propylene diene monomer 14, or silicone with glass, or a fluoropolymer elastomer 18 or some combination thereof. In some aspects where it is used as part of a flexible mandrel 150, silicone with glass refers to silicone with less than 35% glass 15.

Figure 25:
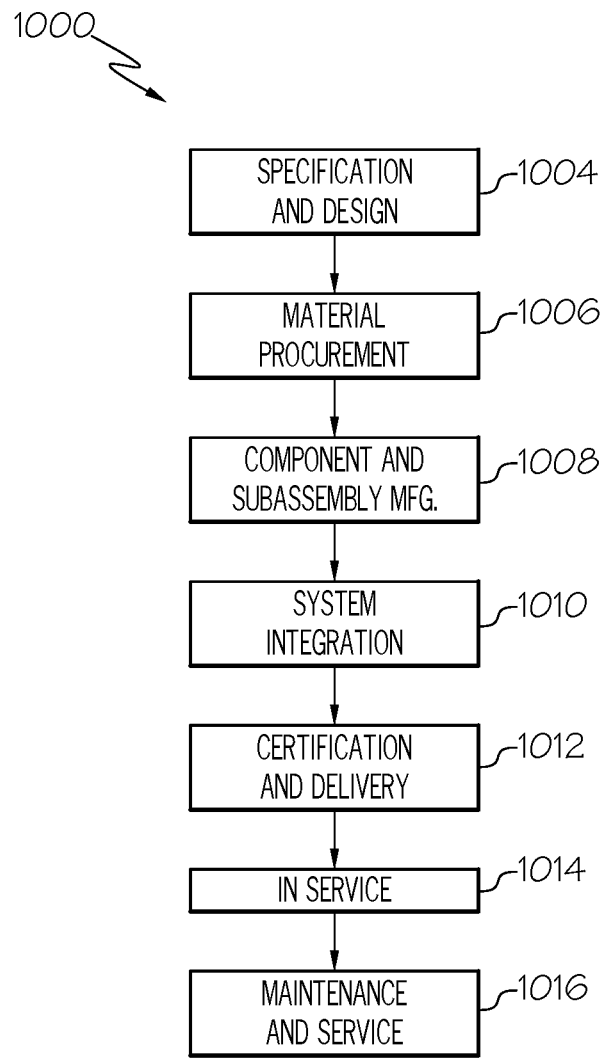
FIG. 25 is a flow diagram of an aircraft manufacturing and service methodology.
Figure 26:
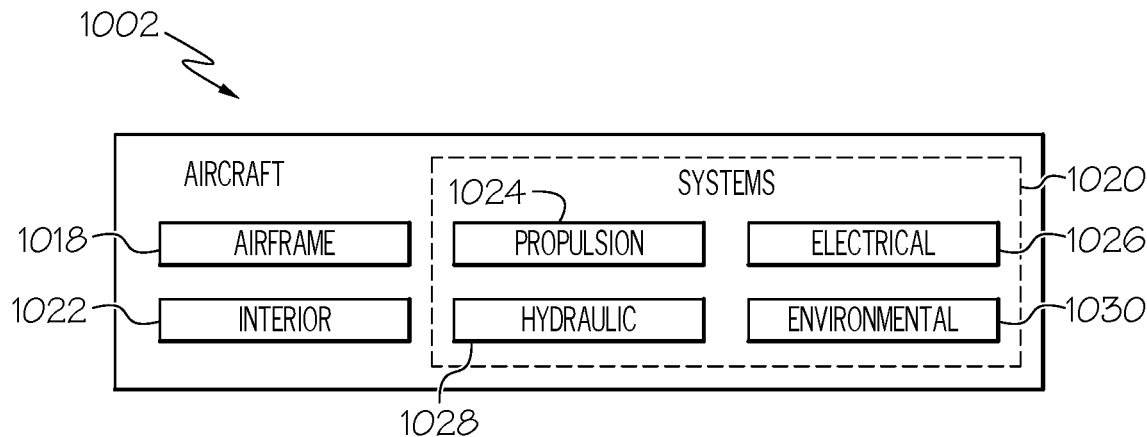
FIG. 26 is a block diagram of an aircraft.

Examples of the disclosure may be described in the context of an aircraft manufacturing and service method 1000, as shown in FIG. 25, and an aircraft 1002, as shown in FIG. 26. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 26, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed cured composite structure may be a composite structure for an aircraft structure. For instance, within examples, the disclosed cured composite structure is a composite structure for a bulkhead, such as a structural bulkhead, a pivot bulkhead, a wheel well bulkhead, or a cargo bulkhead. Other examples are possible as well. The disclosed methods and systems for manufacturing cured composite structures, as well as the resulting cured composite structures, may be employed during any one or more of the stages of the aircraft manufacturing and service method 1000. As one example, the disclosed methods and systems for manufacturing cured composite structures, as well as the resulting cured composite structures, may be employed during material procurement 1006. As another example, components or subassemblies corresponding to component/subassembly manufacturing 1008, system integration 1010, and or maintenance and service 1016 may be fabricated or manufactured using the disclosed methods and systems for manufacturing cured composite structures, as well as the resulting cured composite structures. As another example, the airframe 1018 and the interior 1022 may be constructed using the disclosed methods and systems for manufacturing cured composite structures, as well as the resulting cured composite structures. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

Without wishing to be bound to any particular theory, some aspects of the systems and methods provided herein are expected to provide time savings, structural integrity improvements, design engineering flexibility, or some combination thereof. Some aspects of the systems and methods provided herein improve certain quality attributes such as panel laminate thickness uniformity, or more fine control of component placement and orientation such as, but not limited to, placement of planar fibers, or other components across desired areas of a panel, areas of a first stringer, areas of a second stringer, areas where first stringer and second stringer intersect, or combinations thereof.

The disclosed methods and systems for manufacturing cured composite structures, as well as the resulting cured composite structures, are described in the context of an aircraft; however, one of ordinary skill in the art will readily recognize that the disclosed methods and systems for manufacturing cured composite structures, as well as the resulting cured composite structures, may be utilized for a variety of applications. For example, the disclosed methods and systems for manufacturing cured composite structures, as well as the resulting cured composite structures, may be implemented in various types of vehicles, including, for example, helicopters, passenger ships, automobiles and the like.

Although various examples of the disclosed methods and systems for manufacturing cured composite structures, as well as the resulting cured composite structures, have been shown and described, modifications may occur to those skilled in the art upon reading the specification. The present application includes such modifications and is limited only by the scope of the claims.

What is claimed is:

1. A method for manufacturing a cured composite structure from one or more first stringers, one or more second stringers and a panel, the panel comprising a first side and a second side opposed from the first side, the method comprising:

for each first stringer of the one or more first stringers, supporting the first stringer on the first side of the panel using a rigid tool and a substantially rigid mandrel such that the substantially rigid mandrel is positioned within a first cavity defined between the first stringer and the first side of the panel and the first stringer and the substantially rigid mandrel are at least partially received in a trough defined by the rigid tool;

for each second stringer of the one or more second stringers, supporting the second stringer on the second side of the panel using a flexible mandrel such that the flexible mandrel is positioned within a second cavity defined between the second stringer and the second side of the panel; and co-curing the one or more first stringers, the panel, and the one or more second stringers while the one or more first stringers are supported by the substantially rigid mandrels and the one or more second stringers are supported by the flexible mandrels.

2. The method of claim 1 wherein the first side of the panel is substantially planar.

3. The method of claim 1 wherein the second side of the panel is contoured.

4. The method of claim 1 wherein the one or more first stringers are elongated and define a first path of elongation, and wherein the one or more second stringers are elongated and define a second path of elongation.

5. The method of claim 4 wherein the first path of elongation intersects the second path of elongation.

6. The method of claim 5 wherein the first path of elongation is at an angle relative to the second path of elongation, and wherein the angle is between about 80 degrees and about 100 degrees.

7. The method of claim 4 wherein a projection of the first path of elongation onto an imaginary view plane, and a projection of the second path of elongation onto the imaginary view plane intersect at an angle, wherein the angle is between about 80 degrees and about 100 degrees.

8. The method of claim 1 further comprising removing the substantially rigid mandrel and the flexible mandrel from the cured composite structure.

9. The method of claim 1 wherein the substantially rigid mandrel has a coefficient of thermal expansion between about 86 μm/(m·K) and about 160 μm/(m·K).

10. The method of claim 1 wherein during the co-curing the substantially rigid mandrel expands by a first volume, the first cavity expands by a second volume, and wherein the first volume is substantially the same as the second volume.

11. The method of claim 1 wherein during the co-curing the substantially rigid mandrel expands by a first volume, the first cavity expands by a second volume, and wherein the first volume is between about 95 percent and about 105 percent of the second volume.

12. The method of claim 1 further comprising:
supporting a first plurality of stringers on the first side of the panel, wherein the first plurality of stringers comprises the one or more first stringers; and
supporting a second plurality of stringers on the second side of the panel, wherein the second plurality of stringers comprises the one or more second stringers.

13. The method of claim 1 wherein the rigid tool comprises a planar surface.

14. The method of claim 1 wherein the substantially rigid mandrel has a tensile modulus of at least about 35 MPa.

15. A method for manufacturing a cured composite structure using a rigid tool that defines one or more troughs therein, one or more first stringers, one or more second stringers, and a panel, the panel comprising a first side and a second side opposed from the first side, the method comprising:
for each first stringer of the one or more first stringers, (i) positioning the first stringer on the rigid tool such that the first stringer is at least partially within a trough of the one or more troughs and (ii) positioning a substantially rigid mandrel on the first stringer such that the substantially rigid mandrel is at least partially within the trough;
positioning the panel over the one or more first stringers and over the substantially rigid mandrel such that the first side of the panel faces toward the one or more first stringers and toward the substantially rigid mandrel, and the second side of the panel faces away from the one or more first stringers and away from the substantially rigid mandrel; and
for each second stringer of the one or more second stringers, (i) positioning a flexible mandrel on the second side of the panel and (ii) positioning the second stringer over the flexible mandrel.

16. The method of claim 15, wherein the first side of the panel is substantially planar and wherein the second side of the panel is contoured.

17. The method of claim 15 further comprising bagging the one or more first stringers, the substantially rigid mandrel, the panel, the flexible mandrel, and the one or more second stringers in a vacuum bag.

18. The method of claim 17 further comprising at least partially vacuuming the vacuum bag.

19. The method of claim 18 further comprising co-curing the one or more first stringers, the panel, and the one or more second stringers.

20. A system for manufacturing a cured composite structure comprising a panel having a first side and a second side opposed from the first side, one or more first stringers connected to the first side, and one or more second stringers connected to the second side, the system comprising:
a rigid tool that defines one or more troughs therein;
one or more substantially rigid mandrels, each substantially rigid mandrel positioned within a first cavity defined between a first stringer of the one or more first stringers and the first side of the panel, wherein the one or more first stringers and the one or more substantially rigid mandrels are at least partially received in the one or more troughs of the rigid tool;
one or more flexible mandrels, each flexible mandrel positioned within a second cavity defined between a second stringer of the one or more second stringers and the second side of the panel; and
a curing oven configured to receive therein the panel, the one or more first stringers, the one or more second stringers, the one or more substantially rigid mandrels, and the one or more flexible mandrels.

21. The system of claim 20 wherein the first side of the panel is substantially planar.

22. The system of claim 21 wherein the second side of the panel is contoured.

23. The system of claim 20 wherein the one or more first stringers are elongated and define a first path of elongation, and wherein the one or more second stringers are elongated and define a second path of elongation.

* * * * *